(12) United States Patent
Weeks et al.

(10) Patent No.: US 9,999,112 B2
(45) Date of Patent: Jun. 12, 2018

(54) ELECTRICAL WIRING DEVICE HAVING A BIDIRECTIONAL LIGHT PIPE FOR USE IN AN AMBIENT ENVIRONMENT

(71) Applicant: Pass & Seymour, Inc., Syracuse, NY (US)

(72) Inventors: Richard Weeks, Little York, NY (US); Joshua Haines, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days. days.

(21) Appl. No.: 15/688,536

(22) Filed: Aug. 28, 2017

(65) Prior Publication Data
US 2017/0359882 A1 Dec. 14, 2017

Related U.S. Application Data

(63) Continuation of application No. 14/757,847, filed on Dec. 23, 2015, now Pat. No. 9,746,167.

(51) Int. Cl.
*F21V 7/04* (2006.01)
*H05B 37/02* (2006.01)
(Continued)

(52) U.S. Cl.
CPC ........ *H05B 37/0218* (2013.01); *G01J 1/0407* (2013.01); *G01J 1/32* (2013.01);
(Continued)

(58) Field of Classification Search
CPC .. F21V 23/0464; F21V 23/005; F21V 23/007; G02B 6/0096
(Continued)

(56) References Cited

U.S. PATENT DOCUMENTS

| 7,586,718 B1 * | 9/2009 | Radosavljevic | ....... H01H 71/04 361/42 |
| 7,619,861 B2 * | 11/2009 | Weeks | ................... H01H 71/02 335/18 |

(Continued)

*Primary Examiner* — Thuy Vinh Tran
(74) *Attorney, Agent, or Firm* — Bond Schoeneck & King, PLLC; Frederick Price; George McGuire

(57) ABSTRACT

An electrical wiring device having a plurality of line and load terminals configured to be coupled to an AC electrical distribution system; an electro-optical assembly coupled to the line or load terminals, including at least one circuit coupled to an ambient light sensor, a light emitting assembly and a visual indicator element, the visual indicator element being configured to provide a visual indicator signal, the ambient light sensor being configured to provide a sensor signal corresponding to ambient light in the ambient environment, the at least one circuit being configured to read the sensor signal during a time period when the visual indicator signal are not being emitted, wherein at least one of the visual indicator element and the light emitting assembly is configured to provide a selectable color temperature signal based on user input; and a bidirectional light pipe including a first light pipe branch coupled to the visual indicator element, a second light pipe branch coupled to the ambient light sensor, an interface region coupled between the first and second light pipe branch, the interface region being further coupled to a bidirectional lens element configured to direct the ambient light into the second light pipe branch and direct the visual indicator signal into the ambient environment via the first light pipe branch.

22 Claims, 14 Drawing Sheets

(51) Int. Cl.
*H05B 33/08* (2006.01)
*G01J 1/04* (2006.01)
*G01J 1/32* (2006.01)
*F21V 8/00* (2006.01)
*G01J 1/42* (2006.01)
*F21V 23/04* (2006.01)
*F21V 23/00* (2015.01)

(52) U.S. Cl.
CPC .......... *G01J 1/4204* (2013.01); *G02B 6/0096* (2013.01); *H05B 33/0812* (2013.01); *H05B 33/0818* (2013.01); *F21V 23/005* (2013.01); *F21V 23/007* (2013.01); *F21V 23/0464* (2013.01)

(58) Field of Classification Search
USPC .... 362/551, 555, 558, 582, 641; 361/42, 44, 361/45, 46
See application file for complete search history.

(56) References Cited

U.S. PATENT DOCUMENTS

| | | | |
|---|---|---|---|
| 7,898,779 B2* | 3/2011 | Weeks | H01H 71/02 335/18 |
| 8,120,882 B1* | 2/2012 | Radosavljevic | H01H 83/04 361/42 |
| 9,241,391 B2* | 1/2016 | Richards | H01R 13/652 |
| 2014/0085922 A1* | 3/2014 | Padro | F21V 33/006 362/555 |

* cited by examiner

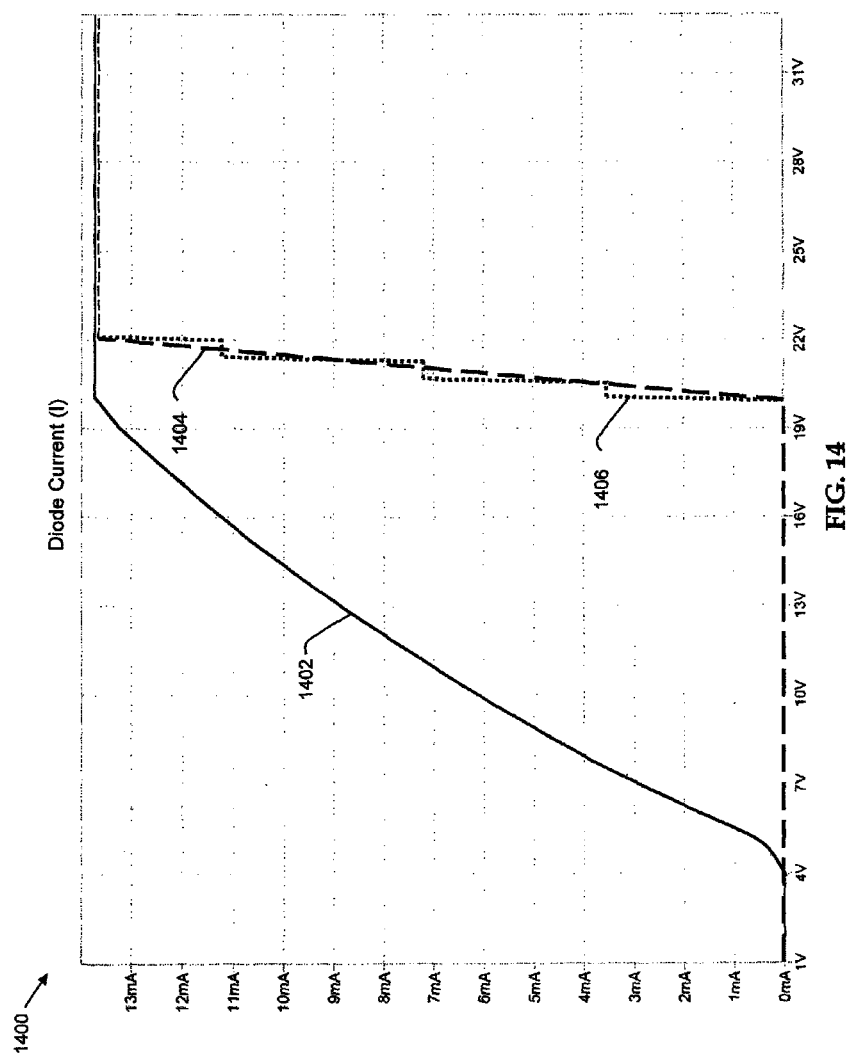

ELECTRICAL WIRING DEVICE HAVING A BIDIRECTIONAL LIGHT PIPE FOR USE IN AN AMBIENT ENVIRONMENT

CROSS-REFERENCE TO RELATED APPLICATIONS

This is a continuation of U.S. patent application Ser. No. 14/757,847 filed on Dec. 23, 2015, the content of which is relied upon and incorporated herein by reference in its entirety, and the benefit of priority under 35 U.S.C. § 120 is hereby claimed.

BACKGROUND OF THE INVENTION

1. Field of the Invention

The present invention relates generally to electrical wiring devices, and particularly to electrical wiring devices with night light capabilities.

2. Technical Background

The breaker panel terminates the AC power service provided by the power utility and distributes AC power to one or more branch electric circuits installed in the structure to form an electrical distribution system. Branch electric circuits often include one or more electrical wiring devices, such as receptacle outlets, that accommodate electrical power plugs. Electrical wiring devices are provided in electrically non-conductive housings that are configured to be installed in outlet boxes. The housing includes electrical line terminals that are electrically insulated from electrical load terminals. The line terminals connect the wiring device to conductive wires from the breaker panel. Feed-through load terminals are connected to downstream wiring that is configured to propagate AC power to one or more downstream electrical loads in the branch circuit. Those of ordinary skill in the pertinent art will understand that the term "load" refers to an appliance, a switch, or some other electrically powered device.

Certain types of faults are known to occur in branch electric circuits and electrical wiring systems. These faults represent serious safety issues that may result in fire, shock or electrocution if not addressed properly. Thus, branch electric circuits typically employ one or more electric circuit protection devices. Protective devices employ a circuit interrupter disposed between the line terminals and the load terminals. The circuit interrupter provides power to the load terminals under normal conditions, but breaks electrical connectivity when the protective device detects a fault condition in the load circuit. There are several types of electric circuit protection devices including ground fault circuit interrupters (GFCIs), ground-fault equipment protectors (GFEPs), arc fault circuit interrupters (AFCIs), transient voltage surge suppressors (TVSSs), or surge protective devices (SPDs). This list includes representative examples and is not meant to be exhaustive. Some devices include both GFCIs and AFCIs. As their names suggest, arc fault circuit interrupters (AFCIs), ground-fault equipment protectors (GFEPs) ground fault circuit interrupters (GFCIs), transient voltage surge suppressors (TVSSs), or surge protective devices (SPD's) perform different functions. Electric circuit protective devices may be disposed within a circuit breaker that provides overcurrent protection, receptacle outlets, plugs, etc. Portable electrical wiring devices, e.g., hair dryers, etc., may also have a protective device disposed therein.

Another safety issue that is of great concern relates to the amount of ambient lighting in a given room or space. In a scenario that most people are familiar with, a person entering a darkened room will usually attempt to locate the wall switch and turn the wall switch to the ON position before entering. There are situations where a light switch is not available, or is not readily available. There are other situations where the person entering the darkened room is disinclined to turn the lights ON as a matter of courtesy.

In one approach that has been considered, a portable lighting device may be inserted into an electrical receptacle located in the room to function as a "night light." While this arrangement may provide a temporary solution to the potentially unsafe condition described above, it has certain drawbacks associated with it. One drawback relates to the fact that once the night light is inserted into the receptacle, it may remain there—day and night—for an extended period of time and represent a waste of energy. After a while, the resident may notice the problem and unplug the light during daylight hours if the space admits natural light. Unfortunately, the resident may forget to plug the light back into the socket until after night fall and finds himself revisiting the darkened room scenario. In addition, once a small night light is unplugged from the receptacle there is the possibility that it will become lost, misplaced, or damaged from excessive handling.

In another approach that has been considered, a light element may be disposed in a wiring device in combination with another functional element such as a receptacle or a light switch. The wiring device is subsequently installed in a wall box or mounted to a panel. While this approach obviates some of the drawbacks described above, there are other drawbacks that come into play. Conventional permanent lighting elements such as incandescent and neon lights have a relatively short life expectancy of only a few years and, therefore, require periodic servicing and/or replacement. This problem is exacerbated by the fact that the light is typically hard-wired to power contacts disposed in the wiring device. As such, the light element is permanently ON, further limiting the light elements life expectancy of the device.

In yet another approach that has been considered, the aforementioned drawbacks are addressed by providing a light sensor, and the associated circuitry, to control the light element. When the sensor detects the ambient light level falling past a certain point, the control circuit turns the light element ON. One design problem associated with using a light sensor to selectively actuate the light element relates to providing a proper degree of isolation between the light sensor and the light element. Conventional devices solve the problem by separating the light sensor and the light element by as great a distance as possible. Because the light sensor must be disposed a sufficient distance away from the light element, it necessarily requires that the lighting assembly be reduced in size to fit the wiring device form factor. Accordingly, conventional devices of this type often fail to provide an adequate amount of illumination for the intended application and, therefore, do not address the safety concern in a satisfactory manner.

In yet another approach that has been considered, a sensor housing has been employed to mechanically couple an ambient light sensor to a circuit board while positioning the sensor as near as possible to a lens positioned on the cover of the device. The sensor housing also prevents any light emitted by light source (e.g., an LED) from being directed toward the light sensor. (Without the isolation housing, the sensor would sense emissions from the night light and the light sensor circuitry would add the night light to the true ambient light levels and would improperly de-energize lamps). One drawback to this approach relates to the lack of available "real estate" within protective wiring devices that include advanced features (such as fault detection in combination with automatic self-test). In other words, using a bulky housing for isolation takes space (within the device) that could be used more productively.

The isolation problem has also been solved by using electronic isolation techniques. Stated generally, false or improper night life turn OFF can be avoided by periodically interrogating the ambient light detector during periods when the night light is OFF. This approach has allowed designers to position LED elements directly adjacent to the ambient light sensor and uses a larger light pipe to direct ambient light toward the sensor and direct LED light into the ambient space via the larger light pipe. The light pipe is coupled to, again, a rather large lens element disposed on the cover of the wiring device. This approach suffers from the same drawbacks associated with using light isolation structures: the large light pipe requires too much real estate on the protective wiring device's circuit board and the corresponding lens requires too much area on the front cover of the device. A similar drawback occurs when a single-gang device is a multi-functional device (e.g., a dual outlet GFCI with test and reset buttons, trip indicator, night light and light sensor). To be specific, the drawback relates to the fact that—in many cases—a reduction of the size of an element (e.g., night light) corresponds to a reduction in its effectiveness. (E.g., a smaller night light typically means that the light output is reduced).

What is needed is an electrical wiring device that is configured to address the drawbacks and needs described above. A light emitting wiring device is needed that provides a sufficient amount of illumination when the ambient light in a given space falls below a safe level. What is also needed is a bidirectional light pipe that can accommodate a light emitting element and a light sensor element disposed at different locations within the wiring device so that light signals from the light emitting element are directed into the ambient environment while ambient light is provided to the light sensor element.

SUMMARY OF THE INVENTION

The present invention addresses the needs described above by providing an electrical wiring device that is configured to address the drawbacks and needs described above. The present invention is directed to a light emitting wiring device that provides a sufficient amount of illumination when the ambient light in a given space falls below a safe level. The present invention is also directed to a bidirectional light pipe that can accommodate a light emitting element and a light sensor element disposed at different locations within the wiring device so that light signals from the light emitting element are directed into the ambient environment while ambient light is provided to the light sensor element.

One aspect of the present invention is directed to a light pipe device that includes a first light pipe branch having a first light flux interface portion at a first-first end thereof and a second light flux interface portion disposed at a first-second end thereof. A second light pipe branch includes a third light flux interface portion at a second-first end thereof and a fourth light flux interface portion disposed at a second-second end thereof. A bidirectional lens element is disposed at one of the first-first end, the first-second end, the second-first end, or the second-second end. An interface region is coupled between the first light pipe branch the second light pipe branch, the interface region being further coupled to the bidirectional lens element, the interface region being configured to direct light propagating in the first light pipe branch out of the bidirectional lens element and into an ambient environment, the bidirectional element being configured to direct ambient light from the ambient environment into the interface region, the interface region being configured to further direct the ambient light into the second light pipe branch.

In one embodiment, the interface region is configured to direct light propagating in the second light pipe branch out of the bidirectional lens element and into an ambient environment, the bidirectional element being configured to direct ambient light from the ambient environment into the interface region, the interface region being configured to direct the ambient light into the first light pipe branch so that the ambient light propagates in the first light pipe branch.

In one embodiment, the first light flux interface portion or the second light flux interface portion is configured to be positioned within a support structure to capture light flux emitted from a light source.

In one embodiment, the third light flux interface portion or the fourth light flux interface portion is configured to distribute light flux propagating in the second light pipe branch onto a sensor element.

In one embodiment, the bidirectional lens element has a substantially concave shape.

In one embodiment, the bidirectional lens element is configured to diffuse light.

In one embodiment, the light pipe device is formed using a material selected from a group of materials including acrylic resin, polycarbonate, epoxy materials, or glass.

In another aspect, the present invention includes an electrical wiring device for use in an ambient environment, the device includes a plurality of line terminals and a plurality of load terminals configured to be coupled to an AC electrical distribution system.

An electro-optical assembly is coupled to the plurality of line terminals or the plurality of load terminals, the electro-optical assembly including at least one circuit coupled to an ambient light sensor, a light emitting assembly and a visual indicator element, the visual indicator element being configured to provide a visual indicator signal, the ambient light sensor being configured to provide a sensor signal corresponding to ambient light in the ambient environment, the at least one circuit being configured to provide a light control signal to the light emitting assembly in response to at least the sensor signal, the light emitting assembly being configured to emit a first light in response to the light control signal, the at least one circuit being configured to read the sensor signal during a time period when the first light or the visual indicator signal are not being emitted. A bidirectional light pipe includes a first light pipe branch coupled to the visual indicator element and a second light pipe branch coupled to the ambient light sensor, the bidirectional light pipe further including an interface region coupled between the first light pipe branch the second light pipe branch, the interface region being further coupled to a bidirectional lens element configured to direct the ambient light into second light pipe branch and direct the visual indicator signal into the ambient environment via the first light pipe branch.

In one embodiment, the first light pipe branch includes a first light flux interface portion at a first-first end thereof and a second light flux interface portion disposed at a first-second end thereof, and wherein the second light pipe branch includes a third light flux interface portion at a second-first end thereof and a fourth light flux interface portion disposed at a second-second end thereof.

In one version embodiment, the interface region is further coupled to the bidirectional lens element disposed at one of the first-first end, the first-second end, the second-first end, or the second-second end.

In one embodiment, the bidirectional lens element has a substantially concave shape.

In one embodiment, the bidirectional lens element is configured to diffuse light.

In one embodiment, the bidirectional light pipe device is formed using a material selected from a group of materials including acrylic resin, polycarbonate, epoxy materials, or glass.

In one embodiment, the at least one circuit is selected from a group of circuits that include a night light circuit, a ground fault circuit interrupter (GFCI), an arc fault circuit interrupter (AFCI), an embedded processor control circuit, a light dimmer, a motor control, or a fan speed control.

In one embodiment, the at least one circuit includes a lighting control circuit selected from a group of lighting control circuits including an analog lighting control circuit, a digital lighting control circuit, or a processor controlled lighting control circuit.

In one embodiment, the light control signal is configured to provide a current signal having a slope equal to the tangent of an angle, the angle being within a range between 60° and 90°.

In one embodiment, the light control signal is configured to provide a current signal having a stepwise slope.

In another aspect, the present invention includes a protective circuit assembly that includes a plurality of line terminals and a plurality of load terminals configured to be coupled to an AC electrical distribution system. A protective assembly includes a sensor portion, a fault detection portion and a switch portion, the sensor portion being configured to provide at least one sensor signal corresponding to electrical signals propagating on the plurality of line terminals or the plurality of load terminals, the fault detection portion being configured to provide a detector output signal when the at least one sensor signal exceeds a predetermined threshold, the switch portion including a conditioning circuit coupled to a switch element, the conditioning circuit generating a control voltage signal in response to the detector output signal, the switch element being configured to turn ON when the control voltage signal is greater than or equal to a switch actuation threshold. An electro-optical assembly is coupled to the plurality of line terminals or the plurality of load terminals, the electro-optical assembly including at least one circuit coupled to an ambient light sensor, a light emitting assembly and a visual indicator element, the visual indicator element being configured to provide a visual indicator signal, the ambient light sensor being configured to provide a sensor signal corresponding to ambient light in the ambient environment, the at least one circuit being configured to generate a light control signal to the light emitting assembly in response to at least the sensor signal, the light emitting assembly being configured to emit a first light in response to the light control signal, the at least one circuit being configured to read the sensor signal during a time period when the first light or the visual indicator signal are not being emitted. A bidirectional light pipe includes a first light pipe branch coupled to the visual indicator element and a second light pipe branch coupled to the ambient light sensor, the bidirectional light pipe further including an interface region coupled between the first light pipe branch the second light pipe branch, the interface region being further coupled to a bidirectional lens element configured to direct the ambient light into second light pipe branch and direct the visual indicator signal into the ambient environment.

In one embodiment, the at least one circuit includes a lighting control circuit selected from a group of lighting control circuits including an analog lighting control circuit, a digital lighting control circuit, or a processor controlled lighting control circuit.

In one embodiment, the light control signal is configured to provide a current signal having a slope equal to the tangent of an angle, the angle being within a range between 60° and 90°.

In one embodiment, the light control signal is configured to provide a current signal having a stepwise slope.

In one embodiment, the first light pipe branch includes a first light flux interface portion at a first-first end thereof and a second light flux interface portion disposed at a first-second end thereof, and wherein the second light pipe branch includes a third light flux interface portion at a second-first end thereof and a fourth light flux interface portion disposed at a second-second end thereof.

In one embodiment, the interface region is further coupled to the bidirectional lens element disposed at one of the first-first end, the first-second end, the second-first end, or the second-second end.

In one embodiment, the bidirectional lens element has a substantially concave shape.

In one embodiment, the bidirectional lens element includes a texture configured to diffuse light.

In one embodiment, the bidirectional light pipe device is formed using a material selected from a group of materials including acrylic resin, polycarbonate, epoxy materials, or glass.

In one embodiment, the light control signal is characterized by a light control signal adjustment range, the light emitting assembly being configured to emit the first light when the light control signal is substantially at or above an ON/OFF threshold position on the light control signal adjustment range and not emit the first light when the light control signal is at or substantially below the ON/OFF threshold position, and wherein the light emitting assembly is further configured to drive the first light from an OFF light setting to a maximum light setting when the light control signal is increased by a light control signal amount, the light control signal amount substantially comprising about 5-10% of the light control signal adjustment range.

In one embodiment, the at least one circuit includes a gating circuit, the gating circuit being configured to regulate a current level propagating through the at least one first light emitting element based on the light control signal, the light control signal being characterized by a light control signal adjustment range, the gating circuit being configured to drive the at least one first light emitting element from an OFF light setting to a maximum light setting when the light control signal is increased by a light control signal amount, the light control signal amount comprising less than about 20% of the light control signal adjustment range.

In one embodiment, the gating circuit is configured to drive the at least one first light emitting element to emit light when the light control signal is substantially at or above an ON/OFF threshold position on the light control signal adjustment range and not emit the first light when the light control signal is substantially at or below the ON/OFF threshold position.

In one embodiment, the ON/OFF threshold position is within a range of positions on the light control signal adjustment range, the range of positions being between 50% and 70%.

In one embodiment, the circuit assembly includes a lighting control circuit coupled to the ambient light sensor and at least one second light emitting element, the lighting control circuit being configured to regulate a current level propagating through the at least one second light emitting element by a light control signal, the light control signal being characterized by a light control signal adjustment range, the gating circuit being configured to drive the at least one second light emitting element from an OFF light setting to a maximum light setting when the light control signal is increased by a light control signal amount, the light control signal amount comprising less than about 20% of the light control signal adjustment range, the lighting control circuit being an analog circuit, a digital circuit, or a processor circuit.

In one embodiment, the at least one second light emitting element is a portion of a night light assembly, the night light assembly also including a night light lens element at least partially disposed in the user accessible front surface.

In one embodiment, the lighting control circuit is configured to drive the at least one second light emitting element to emit light when the light control signal is substantially at or above an ON/OFF threshold position on the light control signal adjustment range and not emit the first light when the light control signal is substantially at or below the ON/OFF threshold position.

In one embodiment, the ON/OFF threshold position is substantially within a range of positions on the light control signal adjustment range, the range of positions being between 50% and 70% of the light control signal adjustment range.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 14 is a chart illustrating a timing feature of the lighting circuit in accordance with yet another embodiment of the present invention.

DETAILED DESCRIPTION

Figures 1A, 1B:
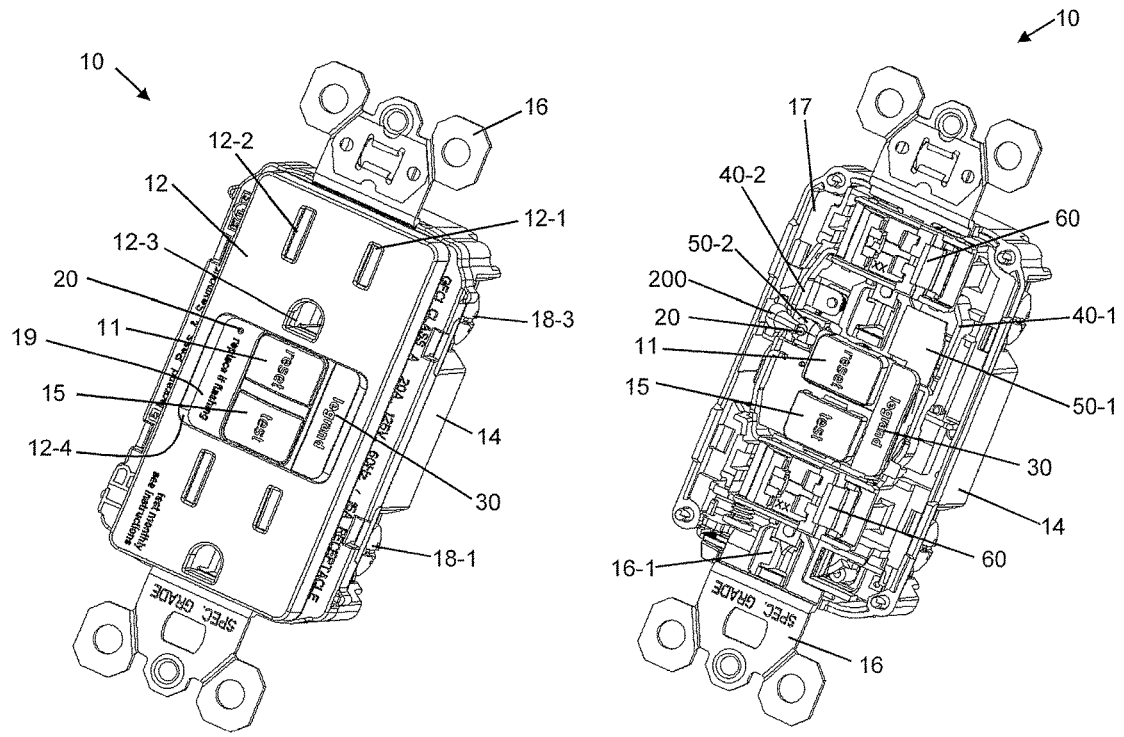
FIGS. 1A-1C are perspective views of an electrical wiring device in accordance with an embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective circuit of the present invention is shown in FIG. 1, and is designated generally throughout by reference numeral 10.

Figure 1C:
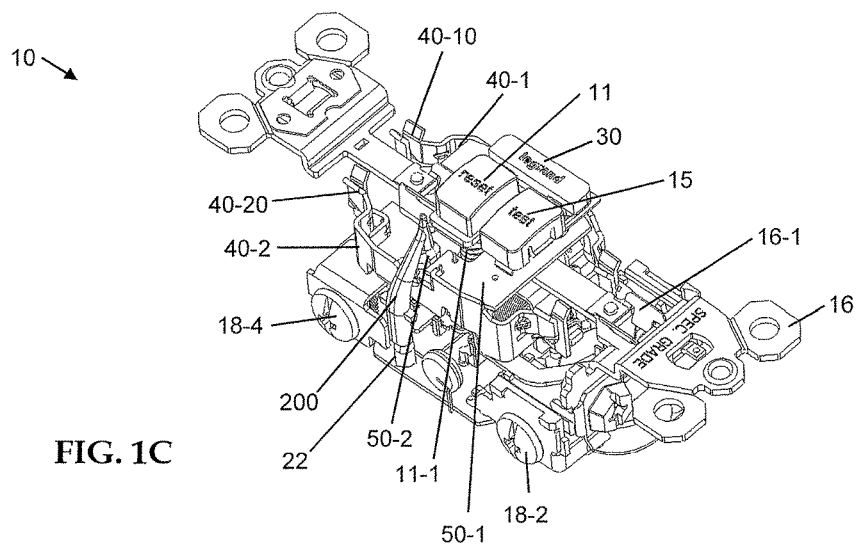

As embodied herein, and depicted in FIGS. 1A-1C, perspective views of an electrical wiring device 10 in accordance with an embodiment of the present invention are disclosed. In reference to FIG. 1, the electrical wiring device 10 includes a front cover assembly 12 coupled to a back body member 14. A mounting strap 16 is disposed therebetween. The mounting strap 16 has mounting ears at each end of the device 10. The mounting ears are used, of course, to connect the wiring device 10 to a device box (not shown). After installation, the device 10 is disposed within the device box so that only the front cover assembly 12 is accessible to the user. Moreover, once the plurality of AC line conductors are connected to the line terminals (18-1, 18-2), and the plurality of AC load conductors are connected to the load terminals (18-3, 18-4), the plurality of AC line conductors and the plurality of AC load conductors are stored in the device box. (Neutral line conductor 18-2 and neutral load conductor 18-4 are not visible in this view).

The front cover assembly 12 includes two sets of user receptacle openings; each set includes a hot receptacle opening 12-1, a neutral receptacle opening 12-2, and a ground receptacle opening 12-3. A recessed user interface region 12-4 is formed between the two sets of receptacle openings (12-1, 12-2, and 12-3). The recessed user interface region 12-4 includes a reset button 11 and a test button 15 disposed in a central region thereof, and flanked on either side by a night light lens cover 30 and a user-readable indicia area 19 that includes a bidirectional indicator lens 20. (The user-readable indicia area 19 reads "replace if flashing." The self-testing circuitry that is configured to illuminate the indicator 20 is described below).

In reference to FIG. 1B, the protective electrical wiring device 10 is shown with the front cover 12 removed. Thus, the hot receptacle load terminal structure 40-1 and the neutral receptacle load terminal structure 40-2 are shown as being disposed on the separator structure 17 that subdivides the housing into two interior volumes. A shutter mechanism 60 is disposed over the hot and neutral receptacle terminal contacts at each end of the device. Thus, each shutter mechanism 60 is aligned with, and disposed between, a set of hot and neutral receptacle openings (12-1, 12-2, respectively) and a set of hot and neutral receptacle terminal contacts (14-10, 14-20, respectively). Reference is made to U.S. patent application Ser. Nos. 14/718,690 and 14/857, 155, which are incorporated herein by reference as though fully set forth in its entirety, for a more detailed explanation of a 15A device shutter assembly and 15/20A device shutter assembly, respectively.

A lighting assembly 50 is also disposed on the separator member 17. The lighting assembly 50 includes a lighting assembly printed circuit board (PCB) 50-1 that is electro-mechanically coupled to the receptacle load terminals (40-1, 40-2), the night light assembly (30, 32) and the ambient light sensor 50-2. PCB 50-1 includes electrical/electronic components, as well as interconnecting traces, to thus form a lighting assembly circuit. The lighting assembly circuits are described below at FIGS. 9-13 herein. The ambient light sensor 50-2 is coupled to the bidirectional light pipe 200; light pipe 200 also includes the bidirectional indicator lens 20.

In reference to FIG. 1C, the protective electrical wiring device 10 is shown with the front cover 12, back body 14, the separator member 17, and the shutter assemblies 60 removed. This view clearly shows the line neutral terminal 18-2 and the load neutral terminal 18-4. Moreover, the hot receptacle load contacts 40-10 and the neutral receptacle load contacts 40-20 are also clearly visible in this view.

The PCB 50-1 includes openings in a central portion thereof that accommodates the reset pin assembly 11-1 (with the make spring coiled there around) and the test button assembly 15. The bidirectional light pipe 200 is an inverted "v-shaped" (or an inverted j-shaped) structure disposed over the indicator LED 22.

Figure 2A:
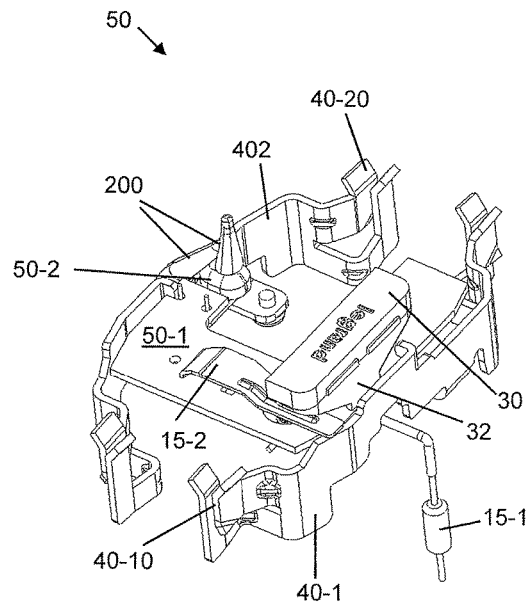
FIGS. 2A-2B are perspective views of a lighting assembly in accordance with an embodiment of the present invention.
Figure 2B:
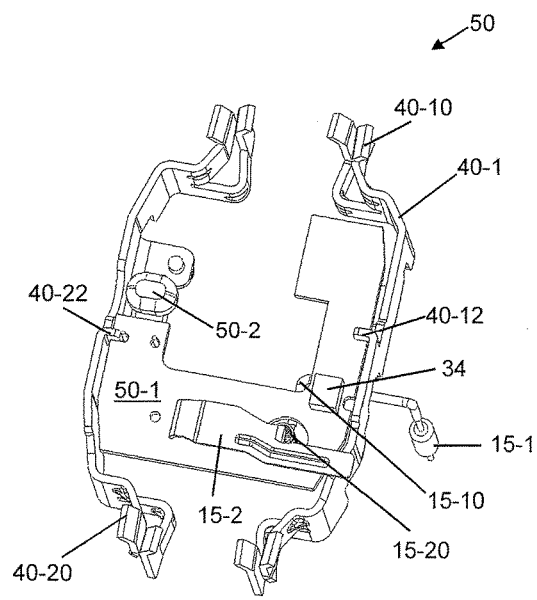

As embodied herein and depicted in FIGS. 2A-2B, perspective views of a lighting assembly 50 in accordance with an embodiment of the present invention are disclosed. In FIG. 2A and FIG. 2B, the PCB 50-1 is more clearly shown as being disposed between the hot receptacle terminal structure 40-1 and the neutral receptacle terminal structure 40-2.

In FIG. 2A, the inverted V-Shaped bidirectional light pipe 200 is shown to include a first leg that extends over the neutral terminal 40-2 (and down to interface LED 22, which is not shown in this view). The other leg of the light pipe 200 is disposed over the ambient light sensor 50-2. At the other side of the PCB 50-1, the night light assembly is shown to include the lens element 30 and the reflector body 32. The test blade 15-2 is coupled to the test resistor 15-1 and extends under the night light reflector body 32. When the test button 15 is depressed by a user, the test button stem (not shown in this view) causes the test blade 15-2 to contact the hot receptacle load terminal structure 40-1 so that a test current flows from the hot receptacle load terminal 40-1 to the line neutral conductor 18-2 via resistor 15-1.

Referring to FIG. 2B, the hot receptacle terminal structure 40-1 includes a PCB connection 40-12 and the neutral receptacle terminal structure 40-2 includes a second PCB connection 40-22 so that the night light assembly 50 is powered by the receptacle load terminals (40-1, 40-2) in this embodiment. (As described below, the night light assembly 50 can also be connected to a source of power via the line terminals, the line terminals in series with an auxiliary switch, or via a processor).

In this view, the night light assembly 50 is shown with the night light lens 30 and the night light reflector 32 removed, so that the night light LED assembly 34 can be seen as being connected to the PCB 50-1. (Since the night light LEDs 34 are powered by the receptacle load terminals (40-1, 40-2) the night light will be OFF when the device 10 is tripped). With the night light lens 30 and the night light reflector 32 removed in this view, the test blade 15-2 can also be clearly seen. To be specific, test blade 15-2 is shown to include a test spring element 15-20 connected to a test wire 15-10. The test wire 15-10 includes two right angle turns before being connected to the test resistor 15-1. Finally, the sensor 50-2 includes two leads that connect it to the PCB 50-1.

Figure 3:
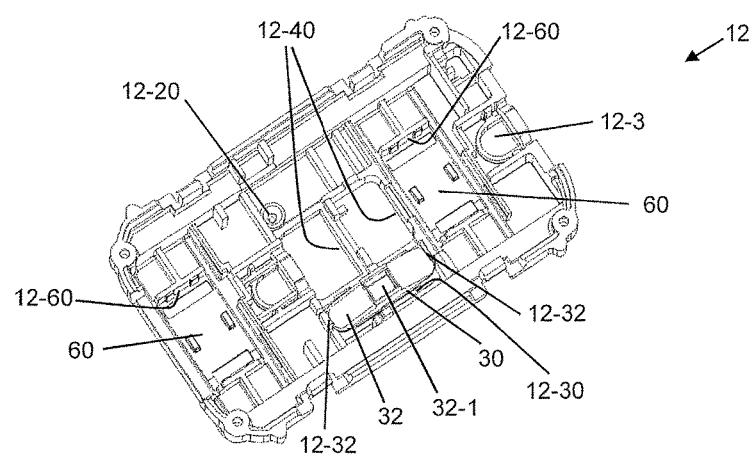
FIG. 3 is a perspective view of the interior portion of the front cover assembly of the wiring device depicted in FIG. 1A.

As embodied herein and depicted in FIG. 3, a perspective view of the interior portion of the front cover assembly 12 of the wiring device depicted in FIG. 1A is disclosed. The interior of the cover 12 includes two pockets 12-60, disposed at either end of the cover 12; each pocket 12-60 is configured to accommodate a shutter assembly 60. The cover 12 also includes openings 12-40 that are configured to accommodate the test button 11 and the reset button 15. An indicator lens mounting interface 12-20 is formed under the user-readable indicia area 19 formed on the exterior surface of the front cover 12. Another interior pocket 12-30 is formed in the interior surface of the front cover 12 and is configured to accommodate various components of the night light assembly 50. Specifically, the night light cover lens 30 is coupled to the reflector 32 which is configured to snap into the pocket 12-30 by way of the snap elements 12-32. The reflector 32 includes an opening 32-1 that is configured to accommodate the night light LED(s) 34.

Figures 4A, 4B, 4C:
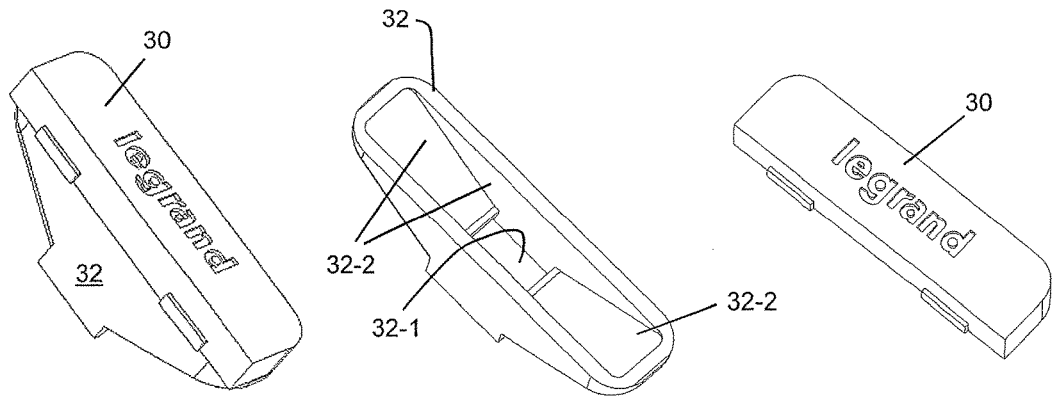
FIGS. 4A-4C are perspective views of a night light housing assembly in accordance with an embodiment of the present invention.

Referring to FIGS. 4A-4C, various perspective views of the night light housing assembly 300 are disclosed in accordance with an embodiment of the present invention. FIG. 4A shows the cover lens 30 coupled to the reflector housing 32. In FIG. 4B, the lens cover 30 is removed so that the interior of the reflector housing can be seen. Again, the reflector 32 includes a center opening 32-1 that is configured to accommodate the night light LED(s) 34. The center opening is surrounded by reflective surfaces 32-2 which are configured to direct the LED light toward the lens cover 30.

It will be apparent to those of ordinary skill in the pertinent art that modifications and variations can be made to reflector element 32 of the present invention depending on the shape, material and/or a desired light distribution pattern. In one embodiment, the reflector 32 may be configured in accordance with a parabolic design having the lamps disposed at a focal point of the reflector. The reflector 32 may also be configured as a modified parabolic design, a concave shape, or in any suitable way in accordance with the above stated variables.

Those of ordinary skill in the art will also understand that reflector 32 may be formed from any suitable material such as plastic or metallic materials. Reflector 32 is furnished with a reflective surface 32-2 that directs light emitted by the LED(s) 34 into the illuminated space. In one embodiment, the reflector 32 is comprised of polished plastic. Surfaces 32-2 may also be formed by depositing a suitable reflective finish thereon. In one embodiment, a reflective surface may be painted on reflector element 32. In another embodiment, the reflector 32 may be formed from a metallic material such as aluminum, and thus, surfaces 32-2 are simply formed from the material itself, i.e., polished aluminum. However, any suitable finish may be applied to the reflector 32 using any suitable application technique.

Referring to FIG. 4C, the top surface of the cover lens 30 is depicted. While lens 30 could be comprised of a substantially clear material, the lens element 30 is typically comprised of a material configured to emit diffused light toward the ambient environment. By emitting diffused light, so-called hotspots are avoided. (Hotspots are bright spots, i.e., images of the LED light source(s), which are visible to the users when the night light is ON). In one embodiment, the cover lens 30 includes a substantially smooth outer surface that is easily cleaned by the user (although the lens may include user-readable indicia formed in the lens cover as shown herein). The underside of lens 30 may include any suitable means for diffusing the LED light such as an array of lenses. The individual lenslets formed in the underside of the lens 30 may be convex lens elements. In another embodiment, the lens elements may be of parabolic, pyramidal, or polygonal shape geometry. Those of ordinary skill in the art will also understand that cover lens 30 may be of any suitable type and be configured as a Fresnel lens array or as a lenticular lens array, depending on the desired illumination pattern.

Figure 5:
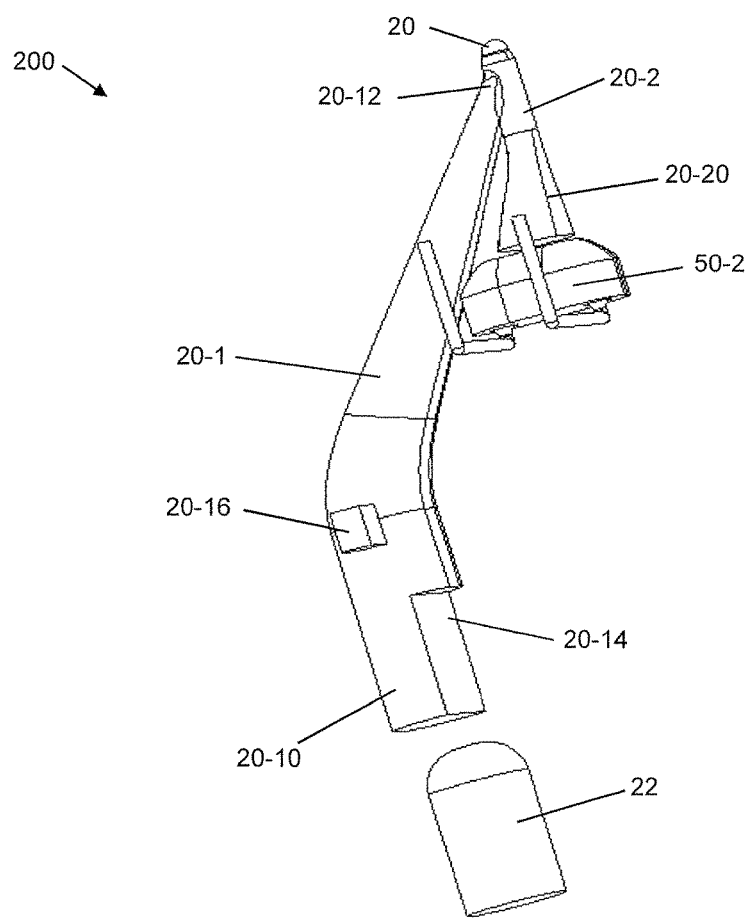
FIG. 5 is a perspective view of a light pipe in accordance with an embodiment of the present invention.

As embodied herein and depicted in FIG. 5, a perspective view of a bidirectional light pipe 200 in accordance with an embodiment of the present invention is disclosed. The light pipe 200 includes an output pipe portion 20-1 and an input pipe portion 20-2 that are joined at an interface region 20-12. The bidirectional indicator lens 20 is formed at one end of the input pipe portion 20-2. The texture of the indicator lens 20 is configured to diffuse the ambient light and direct the ambient light into the light pipe 200. The input pipe portion 20-2 includes a sensor interface portion 20-20 that is configured to distribute ambient light received from the lens element 20 over the surface area of the sensor 50-2.

The output pipe portion 20-1 includes an LED flux interface portion 20-10 that is configured to collect light emitted by the LED 22. A notch 20-14 may be formed in the LED flux interface portion 20-10; the notch 20-14 allows the light pipe 200 to be inserted into an opening formed in the separator 17 (not shown in this view) for mechanical support and positioning purposes. The LED flux interface portion 20-10 also includes a registration element 20-16 that mates with a similar registration opening formed in the separator 17; these registration elements ensure that the light pipe is correctly oriented and positioned relative to the sensor 50-2 and the indicator LED 22.

The bidirectional light pipe 200 may be formed using any suitable optical grade material such as acrylic resin, polycarbonate, epoxy materials, or glass.

Figure 6:
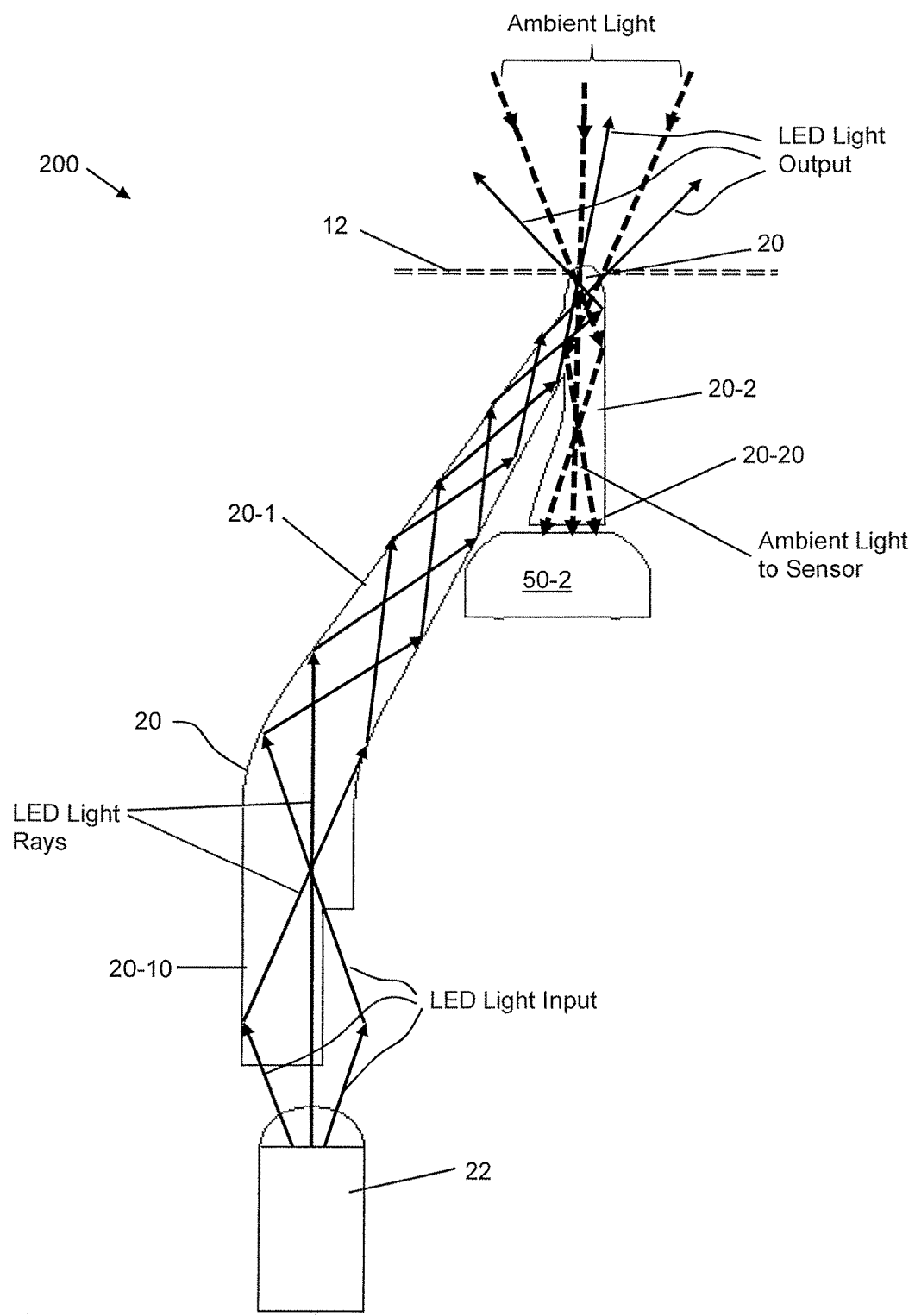
FIG. 6 is a diagram illustrating the bidirectionality of the light pipe depicted in FIG. 5.

In reference to FIG. 6, a diagram illustrating the bidirectionality of the light pipe depicted in FIG. 5 is disclosed. The diagram of FIG. 6 shows the bidirectional qualities of the light pipe 200 and illustrates the optical properties of light pipe 200. Namely, the indicator lens 20 and the LED flux interface portion 20-10 effectively couple the ambient light and the LED light flux, respectively, into their respective branches (20-2, 20-1). Moreover, the input pipe portion 20-2 is configured to transmit the ambient light therethrough so that the ambient light escapes sensor interface portion 20-20 without significant losses. Similarly, the output pipe portion 20-1 is configured to transmit the LED output light to the indicator lens 20 so that it escapes the indicator lens 20 (and into the ambient space) without significant losses.

The indicator lens 20 is accessible to the ambient environment via an opening formed in the cover 12. The dashed lines show the ambient light being directed into the input pipe portion 20-2 (via lens 20) so that the light is diffused and distributed over the sensor 50-2. At the other end of the light pipe 200, the LED 22 indicator light is directed into the output pipe portion 20-1 via the LED flux interface portion 20-10. The light rays are directed "up" the output pipe portion 20-1 and transmitted into the ambient environment via the indicator lens 20. Because the texture of the indicator lens 20 is configured to diffuse light, the LED output light is likewise diffused into the ambient environment so that it is readily seen by the occupants of the ambient space.

In one embodiment of the present invention, the LED output light provides trip indication. Since the night light is OFF in the tripped state (in one embodiment of the invention), the LED output light—in combination with the night light being OFF—provides a clear indication (in a darkened ambient space) that the device 10 is tripped.

Figure 7:
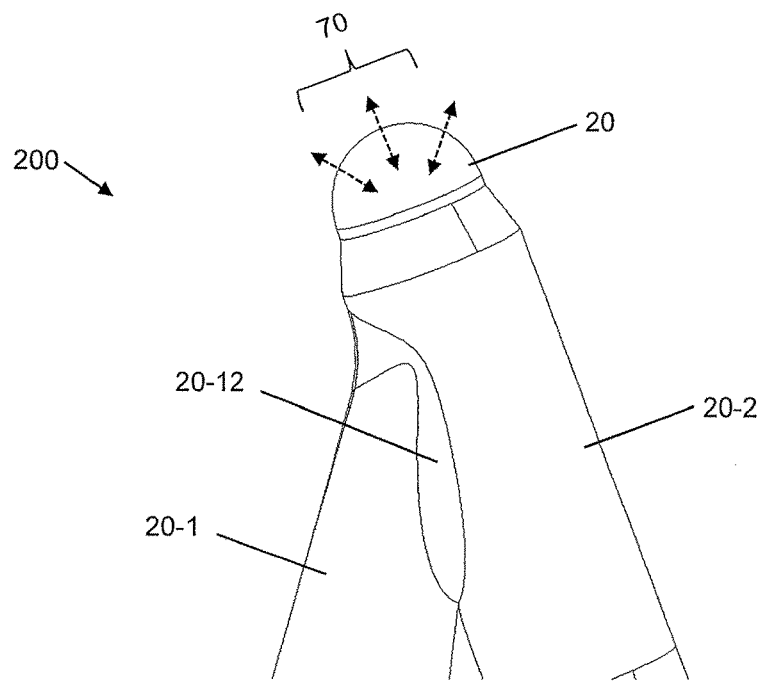
FIG. 7 is a detail view of a bidirectional lens of the light pipe depicted in FIG. 5.

Referring to FIG. 7, a detail view of a bidirectional lens 20 of the light pipe 200 depicted in FIG. 5 is disclosed. The texture of the indicator lens 20 is configured to diffuse the ambient light; and the rounded or concave shape of the indicator lens 20 is configured to direct the ambient light into the light pipe 200 (and transmit LED light into the ambient environment). The concave indicator lens 20 is configured to enhance flux coupling so that the ambient light is efficiently captured and detected. (The bidirectional light 70 represents the ambient light and the LED output light).

Figure 8:
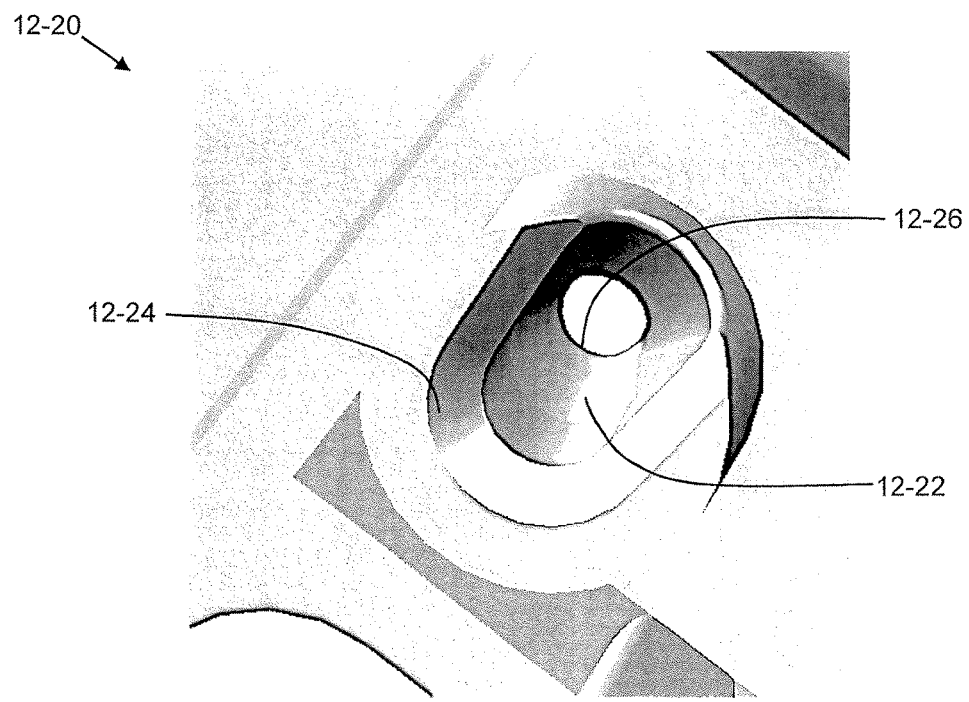
FIG. 8 is a detail view illustrating a lens mounting interface formed in the interior portion of the front cover assembly depicted in FIG. 3.

Referring to FIG. 8, a detail view illustrating a lens mounting interface 12-20 formed in the interior portion of the front cover assembly 12 depicted in FIG. 3 is disclosed. The lens interface 12-20 includes an opening 12-26 formed in the cover 12. The opening 12-26 is configured to be about the same size (or slightly larger) as the indicator lens element 20. The opening 12-26 is surrounded by a reinforcing collar 12-24 that is configured to provide structural support and rigidity to the cover 12 in this region. A contoured surface 12-22 provides a volume that is shaped and configured to accommodate the lens interface region 20-12 (or at least an upper portion thereof) therein.

Figure 9:
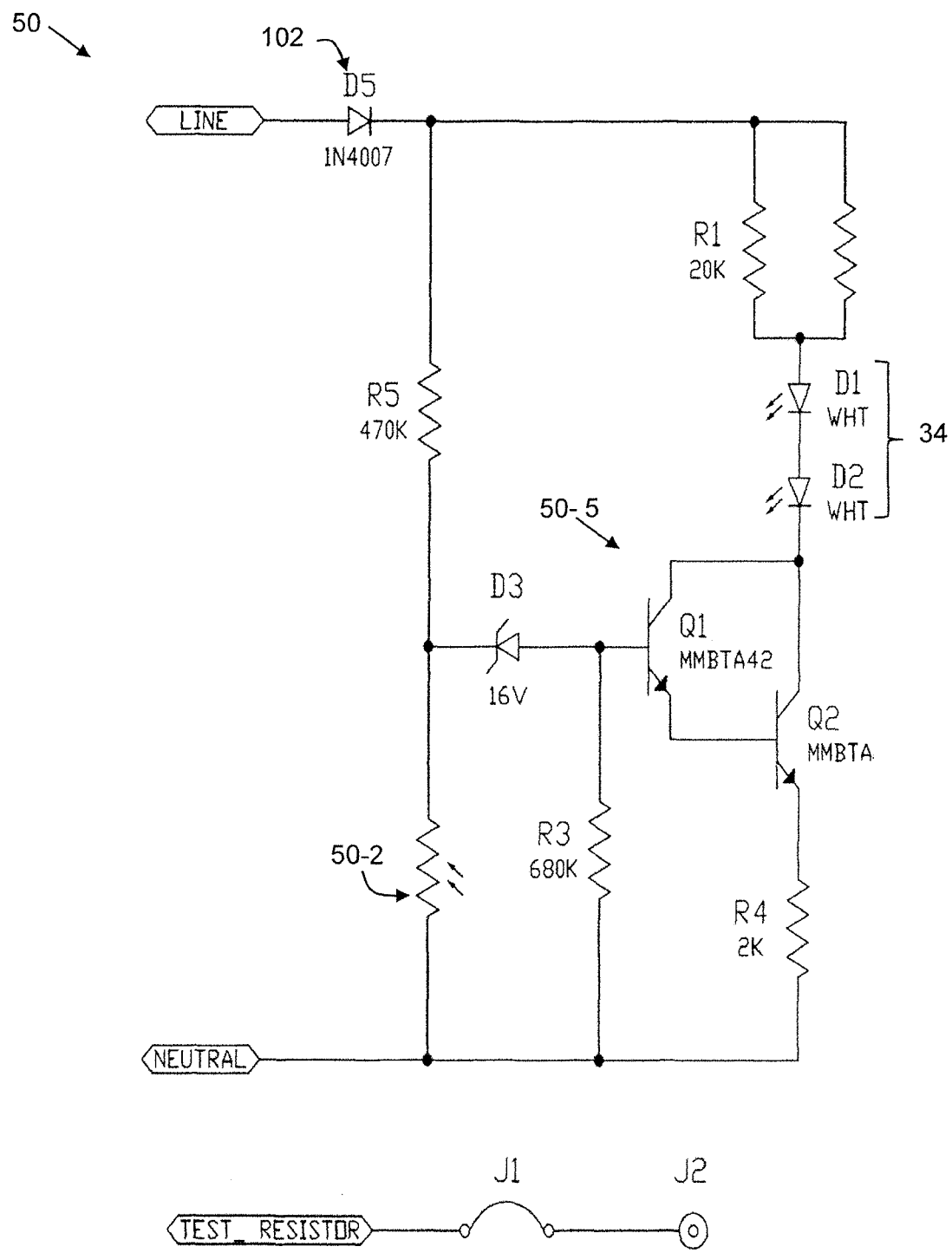
FIG. 9 is a schematic diagram of an analog night light circuit in accordance with an embodiment of the present invention.

As embodied herein and depicted in FIG. 9, a schematic diagram of an analog night light circuit 50 in accordance with an embodiment of the present invention is disclosed. A half-wave power supply 102 (diode D5) is connected to the line terminal and provides the positive half of the AC wave (the other half is blocked) to the night light circuit.

The night light circuit 50 includes a Darlington transistor pair (transistor 50-5) that is configured (by the resistor network) to turn the night light LEDs 34 ON in accordance with the chart shown in FIG. 14. (A Darlington pair is comprised of two transistors that function as one transistor, but with a much higher gain).

The gate of the transistor 50-5 is connected to zener diode D3 and the voltage divider including resistor R5 and photoresistor sensor 50-2. Thus, the resistive value of sensor 50-2 is a function of the ambient light (or lack thereof) in the ambient space. Specifically, when the ambient light is relatively high, the resistance of the sensor 50-2 is relatively low so that the zener diode D3 prevents the transistor 50-5 from turning ON; and thus, zener diode D3 is configured to establish the diode ON threshold voltage (See FIG. 14). Moreover, since the sensor 50-2 resistance is inversely proportional to ambient light, when the ambient space is relatively dark, the sensor resistance is relatively high and, thus, the voltage divider provides the zener D3 with a voltage that causes the transistor to be turned ON.

Turning now to FIG. 14, a diagram illustrating a timing feature of the lighting circuit 50 in accordance with yet another embodiment of the present invention is disclosed. The curve 1402 represents conventional lighting circuits. Note that the lamp current (vertical axis) ramps-up (in substantially a linear way) as the input voltage is increased. This suggests that the night light is also increased (in substantially a linear way) as the ambient light decreases. The inventors of the present invention have noted that there are at least two drawbacks to this approach represented by curve 1402. First, it is not energy efficient because the night light is being energized when the ambient light is relatively high. The second reason relates to the first reason: many consumers do not want the night light ON when there is natural or ambient light in the room.

In order to overcome these drawbacks, the circuit shown in FIG. 9 has been "tailored" to produce the curve 1404 whereby the lamp current is almost vertical at a predetermined input transistor input voltage. The inventors have implemented this scheme in at least three ways. First, the voltage divider is configured to turn on the transistor 50-5 when the ambient space is relatively dark. Second, the values of the emitter resistor R4 and the parallel limiter resistors R1 are balanced so that the night light has a "hard" turn ON while simultaneously limiting power dissipation. Specifically, the emitter resistor R4 is implemented using a relatively small resistor so that the transistor 50-5 turns on rather abruptly (see curve 1404). At the same time, the limiter resistor R1 is implemented using a relatively high resistance to thus reduce current (and thus power dissipation).

Figure 10:
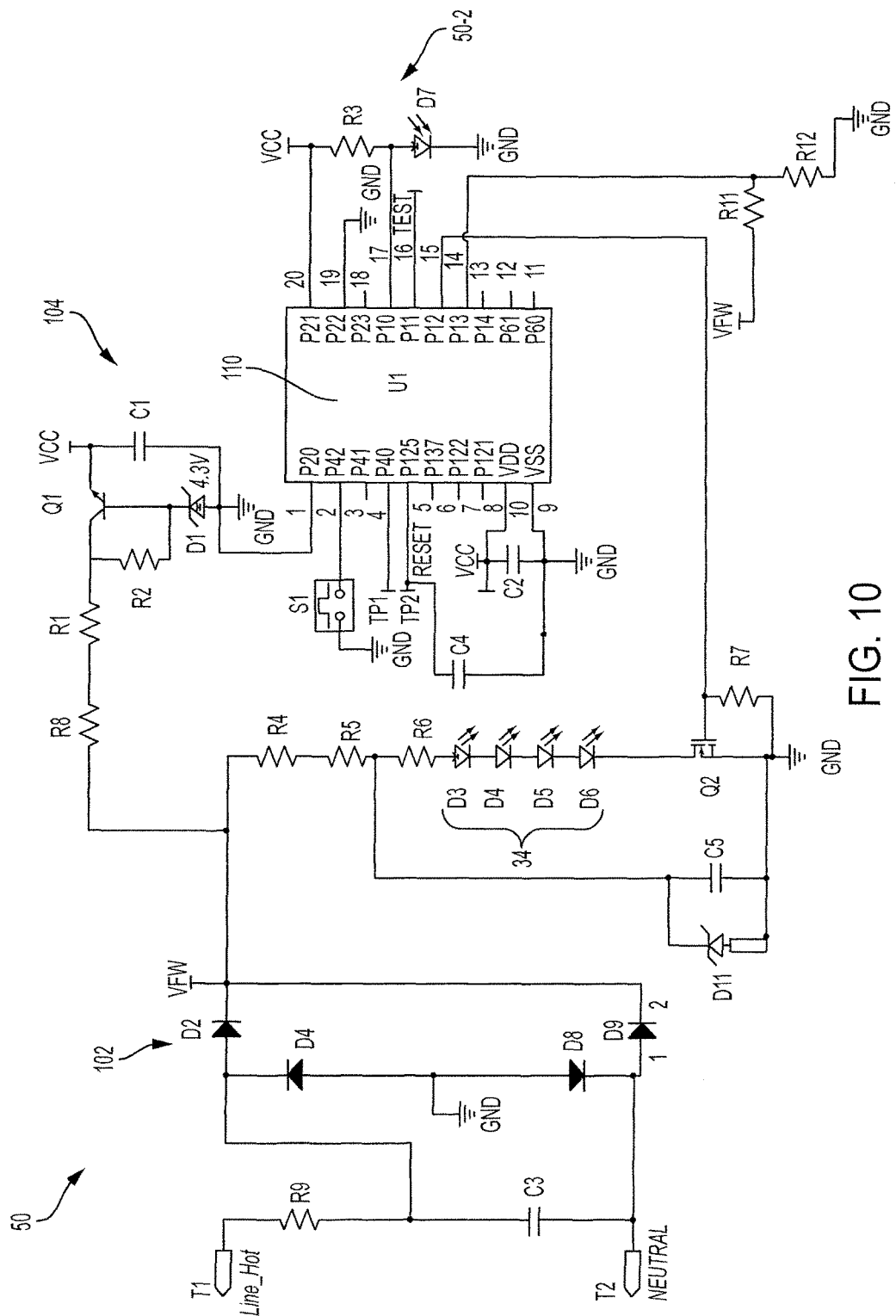
FIG. 10 is a schematic diagram of a digital night light circuit in accordance with another embodiment of the present invention.

As embodied herein and depicted in FIG. 10, a schematic diagram of a digital night light circuit 50 in accordance with another embodiment of the present invention is disclosed. AC power is configured to be coupled to the hot and neutral line terminals T1 and T2. The line terminals are coupled to a full wave power supply 102 (i.e., diodes D2, D4, D8, D9), which is configured to provide power to the night light LEDs 34 (D3, D5, D6, and D10). The night light circuit 50 includes a 5 VDC regulated power supply 104 that is coupled to the bridge power supply 102. The 5 VDC regulated power supply 104 is comprised of resistors R1, R2 and R8, diode D1, transistor Q1 and capacitor C1. The regulated power supply 104 provides the DC voltage to the logic circuit implemented by microcontroller 110. The full wave power supply 102 provides DC power to the lighting control transistor Q2 via resistors R4-R6. The full wave power supply 102 provides a zero-cross signal to the controller 110 via resistors R11 and R12; the zero-cross is employed to provide the controller 110 with AC power cycle timing.

The lighting LEDs 34 are turned ON when transistor Q2 is turned ON by microcontroller 110 (U1) in accordance with the ambient light sensor 50-2 input. The night light 34 is OFF when microcontroller 110 turns transistor Q2 OFF. When Q2 is OFF (and hence night light 34 is OFF), the controller 110 interrogates the ambient light sensor 50-2. Those skilled in the art will appreciate that the lighting curve 1404 provided in FIG. 14 can be implemented in software code by controller 110. As noted below, a stepwise curve can also be implemented in software code by controller 110.

The controller 110 may be implemented using any suitable device, but in one embodiment of the present invention, the embedded controller 110 is an 8-bit CMOS based microcontroller that executes instructions in approximately 200 nanoseconds and includes 8 channels for the 10-bit Analog-to-Digital (A/D) converter one or more comparators and at least 128 bytes of EEPROM data memory as well as FLASH program memory.

The control circuit 110 is coupled to the ambient light sensor 50-2 and is programmed to sample the sensor output only when transistor Q2 (and thus night light 34) is OFF to thereby implement an electronic light barrier. The control circuit 110 works in conjunction with the switch S1 and the light sensor 50-2. (Briefly, the switch S1 provides controller 110 with the user's ON/OFF decisions). The controller 110 is programmed to observe two different ambient light thresholds (T1, T2). In reference to curve 1406 at FIG. 14, one can imagine that this cycle is controlled by the alternating phases of the day and night cycle. Thus, when night approaches, the ambient light is declining and it reaches the lower threshold T1, and the controller 110 turns the night light 34 ON (at a level that is controlled by the switch S1) until the ambient light begins to increase again, i.e., at daybreak. As the ambient light is increasing, it will pass the lower threshold T1 and the LEDs will remain ON. It is not until the ambient light reaches the higher threshold T2 that the controller 110 turns the LEDs OFF. In one embodiment of the present invention, the controller 110 is programmed to delay the extinguishing of the LED light by four seconds after the second threshold. During the four second time frame, the lights fade until they are completely extinguished.

In one embodiment, the switch S1 is configured to select the light level of the night light 34 from OFF, LOW, MEDIUM or HIGH settings (curve 1406, in contrast, has one additional ON setting). Light levels OFF, LOW, MEDIUM and HIGH are manifested by controller 110 by way of a pulse width modulation (PWM) where the PWM duty cycle varies. In the OFF setting, transistor Q2 is OFF. In the LOW setting, pin 15 of the controller 110 turns ON transistor Q2 at duty cycle T3. In the MEDIUM setting, pin 15 of the controller 110 turns ON transistor Q2 at duty cycle T4. In the HIGH setting, pin 15 of the controller 110 turns ON transistor Q2 at duty cycle T5. Duty cycles are arranged such that T3 is less then T4 and T4 is less than T5.

Figure 11A:
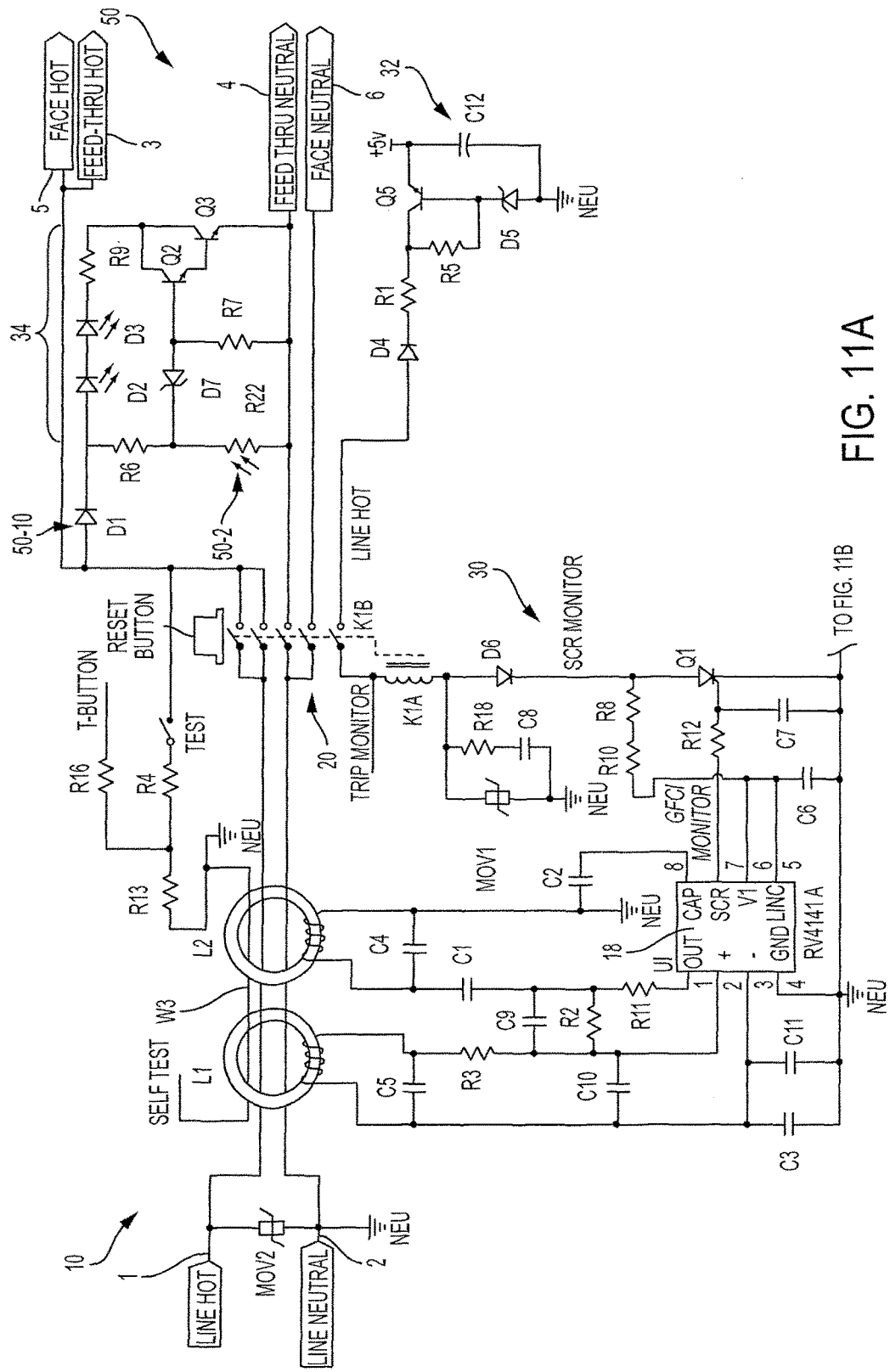
FIGS. 11A-B are schematic diagrams of a GFCI with an analog night light circuit in accordance with another embodiment of the present invention.
Figure 11B:
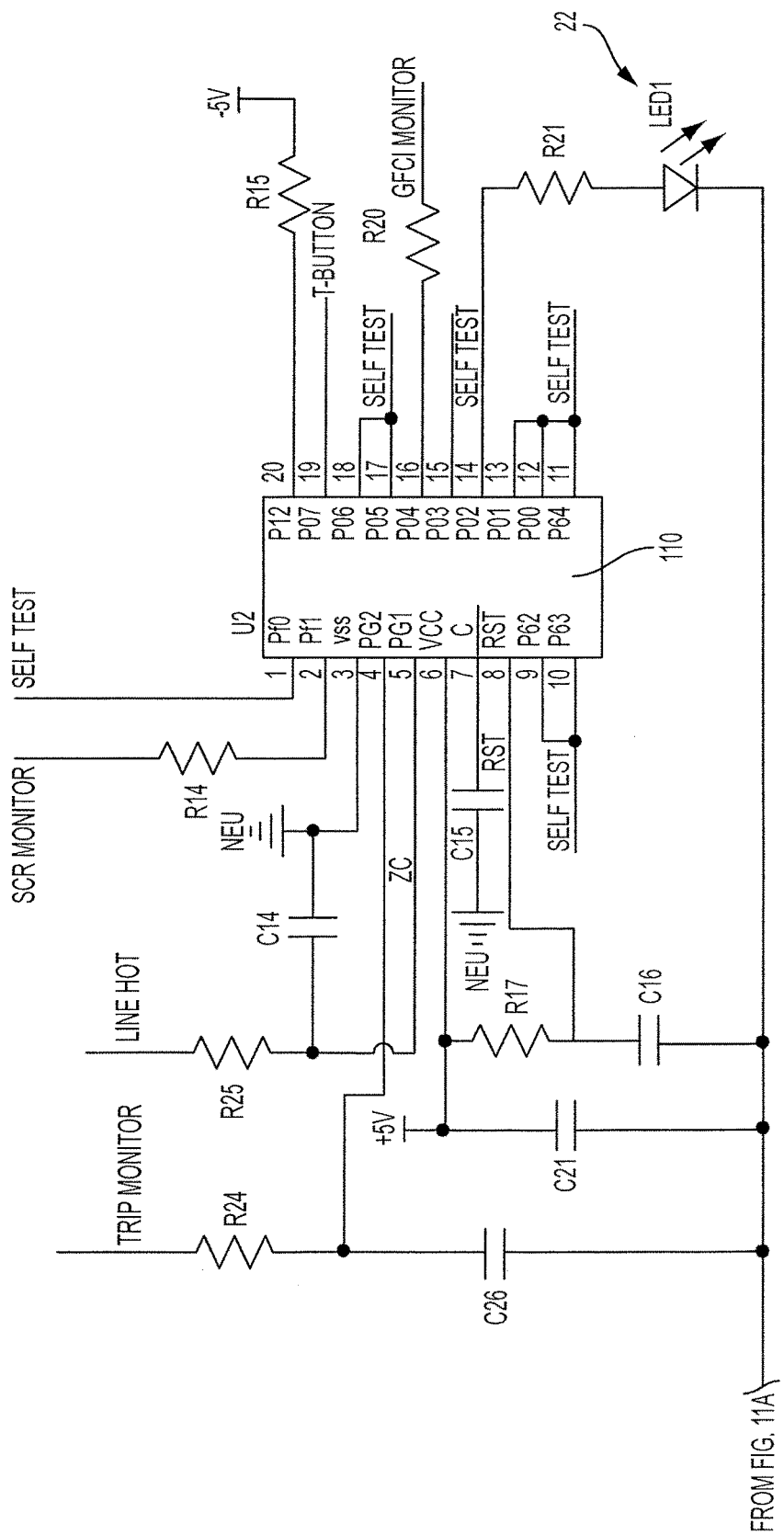

As embodied herein, and depicted in FIGS. 11A-11B, schematic diagrams of a protective device 10 in accordance with an embodiment of the present invention are disclosed. The device 10 includes a differential transformer L1 and a grounded neutral transmitter L2. The differential transformer L1 includes a secondary winding which is coupled to the fault detector integrated circuit 18 by way of noise filtering circuitry. The differential transformer L1 senses the current differential between the hot and neutral conductors and provides a sensor signal to the ground fault detector chip 18 via the (VFB, Vref) inputs. When the differential current (sensor signal) exceeds a predetermined threshold value, the fault detector 18 should cause the SCR output to go HIGH.

A grounded neutral condition occurs when the load neutral conductor is accidentally grounded to create a parallel conductive path (relative to the neutral return path) between the neutral line terminal 2 and neutral feedthrough load terminal 4. The grounded neutral transmitter L2 is configured to sense this condition by coupling its sensor signal (from the parallel path) onto the neutral conductor (but not the hot conductor) to create a differential current that is sensed by the differential transformer L1. As before, when the sensor signal exceeds a predetermined threshold value, the fault detector 18 should generate the fault detection output signal.

The ground fault detector 18 receives power from a GFI power supply 30 circuit and is configured to detect actual ground fault conditions during one half cycle of the AC line cycle. Specifically, a ground fault in the electrical distribution system will be detected by ground fault detector 18 in an interval (i.e., about 30°-90°) within the positive half of the AC line cycle. The detector 18 output signal (SCR) is provided in the middle of the AC line cycle (i.e., about 60°-120°) and is configured to turn the SCR Q1 ON. When SCR Q1 conducts in the middle of the AC line cycle, the solenoid K1A is energized so that the solenoid armature trips the circuit interrupter and the auxiliary switch K1B. Solenoid K1A remains energized for a time period that is typically less than about 25 milliseconds causing the circuit interrupter 20 to trip. Once the fault condition is resolved, K1A is no longer energized and the circuit interrupter may be reset by way of a mechanical reset button. Note that processor 110 is not used to detect ground faults, grounded neutral conditions or arc faults.

The processor 110 automatically and periodically initiates three tests that are used to test the operability of the GFCI. Briefly stated, when processor 110 determines that the GFCI circuit has failed any of the tests a predetermined number of times, the processor 110 is programmed to interpret this as an end of life condition. In the embodiment of FIGS. 11A-B, processor 110 is configured to trip the circuit interrupter by transmitting the Q1 Gate signal to turn the SCR Q1 ON during the positive half cycle (in order to energize solenoid K1A). The processor 110 indicates that the device is in an end-of-life state by causing the indicator LED LED1 to flash. (Note also that the embodiment of FIGS. 11A-B is able to indicate, but not interrupt, certain end-of-life conditions such as an open solenoid K1A or an open SCR Q1).

Protective device 10 includes two power supply circuits that operate independently. Both power supplies are half wave power supplies; neither supply is powered during the negative half cycle of the line voltage. The GFI power supply 30 includes diode D6, resistors R8 and R10, and capacitor C6. The diode D6 is connected to Line Hot by way solenoid K1A, which is in series with auxiliary switch K1B. The GFI power supply 30 provides power to fault detector 18 when the auxiliary switch K1-B is closed; i.e. when the device is in the reset state. Because of the way diode D6 is biased, diode D6 charges the capacitor C6 only during the positive half cycle of the AC line cycle. The capacitor C6 provides power to the detector chip, which is configured to detect faults during the positive half cycle of the AC line cycle. Capacitor C6 is also configured to function as a current source to the anode of SCR Q1 during the negative half cycle of the line cycle, when the SCR Q1 is auto-tested.

The second power supply 32 services the processor; and it includes diodes D4, zener diode D5, transistor Q5, resistors R1, R5, and capacitor C12. Current flows through diode D4 during the positive half cycle to charge capacitor C12. Unlike the fault detection power supply 30, the processor power supply 32 is directly connected to line hot, i.e., it is not connected via the auxiliary switch K1-B. Accordingly, the processor is powered and operational when the circuit interrupter contacts are tripped and device 10 is properly wired.

The GFI power supply 30 is disposed in series with the auxiliary switch K1B and the solenoid K1A. When the auxiliary switch K1C is closed, the inductance of the solenoid K1A (in combination with movistor MOV1 or capacitor C8) protects the GFCI circuitry from lightning surges that could otherwise damage it. The auxiliary switch K1B also protects the solenoid K1A if SCR Q1 shorts out, because the auxiliary switch K1B is configured to interrupt power to the GFCI circuit when the circuit interrupter 20 trips.

The auxiliary switch K1B is connected to the processor 110 by way of the TRIP Monitor signal. (If the TRIP Monitor signal is HIGH, then the processor determines that the device is reset; if the signal is LOW, then processor 80 determines that the device is tripped). The device 10 also includes a red LED LED1 that is coupled to pin 14 (P02) of the microprocessor 110. When the processor determines that the auxiliary switch is tripped, it is configured to turn LED ON with a steady light to provide trip indication. When an end-of-life condition is detected, the processor 110 causes LED LED1 to emit a blinking light. The auxiliary switch K1B is disposed entirely on the Line side of the circuit interrupter 20 and therefore, the TRIP monitor signal does not directly monitor the status of the circuit interrupter contacts. The TRIP monitor signal is a proxy signal because, as noted above, it could show an absence of a Line Hot signal when the circuit interrupter contacts were in fact closed. (Thus, Trip Monitor is not used to detect a defective interrupting contact fault condition).

Device 10 includes automated self-testing that is implemented by, inter alia, test wire self-test and processor 110. The self-test circuit includes a third wire self-test that passes through the toroidal sensors L1 and L2. The third wire self-test is connected to a plurality of output pins of the processor 110 which are tied together to form the self-test output. In one embodiment, the outputs of eight N-channel MOSFET CMOS transistors—internal to the processor 110—are connected in parallel to form the grounded neutral loop self-test that extends through the differential and grounded neutral toroids (L1, L2). The grounded neutral simulated fault is produced by turning on the transistor output ports to a LOW level at an appropriate time (as determined by processor 110).

One advantage for using the third wire self-test within the wire loop relates to improved noise immunity. Had the third wire been eliminated and a segment of the hot or new conductor used in its place, electrical noise or voltage drops in that segment would propagate a noise current in the loop. The noise current could impair the test fault signal and its detection by the GFCI detector 18. Usage of the third wire solves that problem by isolating the wire loop from the power conductors.

The processor 110 is also connected to other I/O lines in order to perform and monitor the self-testing procedure. For example, the dual purpose Q1 Gate signal is connected to processor pin P04 and the gate filter (R12, C7) of the SCR Q1 gate. In the first test, the processor uses Q1 Gate to monitor the output of the detector 18. In the second test, the processor 110 uses Q1 Gate as an input to charge the Q1 Gate filter circuit. The processor pin Pf1 is connected to the anode of the SCR Q1 to monitor the SCR Anode (D6 cathode) during the second and third tests.

While the processor 110 monitors the auxiliary switch (TRIP Monitor signal) for trip detection and wiring state detection, it does not use the TRIP monitor signal for any self-test purposes. In other words, an end-of-life condition is not recognized on the basis of the TRIP monitor signal.

In one embodiment the microcontroller 110 may be implemented by a processor such as the Renesas R5F10266. The processor 110 provides a 1 MHz clock signal that is used for digital clocks and other internal timing signals. The processor 110 is a 16-bit microcontroller that is widely used in embedded processor designs. The processor 110 includes 2 kB ROM to store the firmware and 2 KB Flash memory to implement the wiring state register. In another embodiment of the invention, the processor 110 is implemented using a Fujitsu MB 95f564k processor. This processor is a 20 pin device and includes an 8 bit processor having a 1 MHz clock, 20 kB of ROM and 496 B of flash memory.

It will be apparent to those of ordinary skill in the pertinent art that modifications and variations can be made to the processor 110 of the present invention depending on the degree of processing sophistication. The embedded processor 110 includes on-board memory that typically includes random access memory (RAM) and read only memory (ROM). The embedded processor 110 functions may be implemented using hardware, software, embedded processors, signal processors, RISC computers, application specific integrated circuits (ASICs), field programmable gate array (FPGA) devices, gate array state machines, customized integrated circuits and/or a combination thereof. The RAM memory may have battery back-up. Thus, the embodiments of the present invention are not limited to any specific combination of hardware circuitry and/or software. Taken together, RAM and ROM may be referred to herein as "computer-readable media." The term "computer-readable medium," as used herein, refers to any medium that participates in providing data and/or instructions to the processor for execution. For example, the computer-readable media employed herein may include any suitable memory device including SRAM, DRAM, NVRWM, PROM, E²PROM, Flash memory, or any suitable type of memory. The Flash memory, or RAM with battery back-up, are examples of non-volatile memory that is provided herein to store the wiring state of the device for multi-use miswire purposes.

As depicted in FIGS. 11A-11B, a nightlight circuit is coupled between the hot receptacle terminal (or feedthrough load hot) and the neutral receptacle terminal (or feedthrough load neutral). This nightlight circuit, due to its connection to the load hot and load neutral terminals, will only become active when device 10 is reset and a source voltage is present on said load terminals. The half-wave nightlight circuit power supply 50-10 (Diode D1) provides power to the night light 34 (LEDs D2 and D3), Darlington transistor pair Q2 and Q3 and resistor R9, where current through this path occurs during the positive half cycle when the conditional input to Q2 and Q3 is met. The conditional input to Q2 and Q3 is formed by resistors R6 and R7, photo-resistor R22 and zener diode D7. Photo-resistor R22 in combination with resistor R6 forms a voltage divider such that when incident/ambient light is low, the voltage at D7 cathode is high. Zener diode D7 passes current when reverse biased with a high enough voltage and biases Q2 and Q3 ON. Nightlight circuit behavior and performance is substantially the same as the nightlight of FIGS. 9 and 14. Reference is made to U.S. patent application Ser. No. 13/834,636, which is incorporated herein by reference as though fully set forth in its entirety, for a more detailed explanation of a GFCI having a non-volatile Memory miswiring circuit. Those skilled in the art will appreciate that the night light circuit 50 depicted in FIGS. 11A-11B may be employed in an Arc Fault Circuit interrupter (AFCI) or a combination GFCI/AFCI. Reference is made to U.S. Pat. No. 6,421,214, which is incorporated herein by reference as though fully set forth in its entirety, for a more detailed explanation of an AFCI.

Figure 12A:
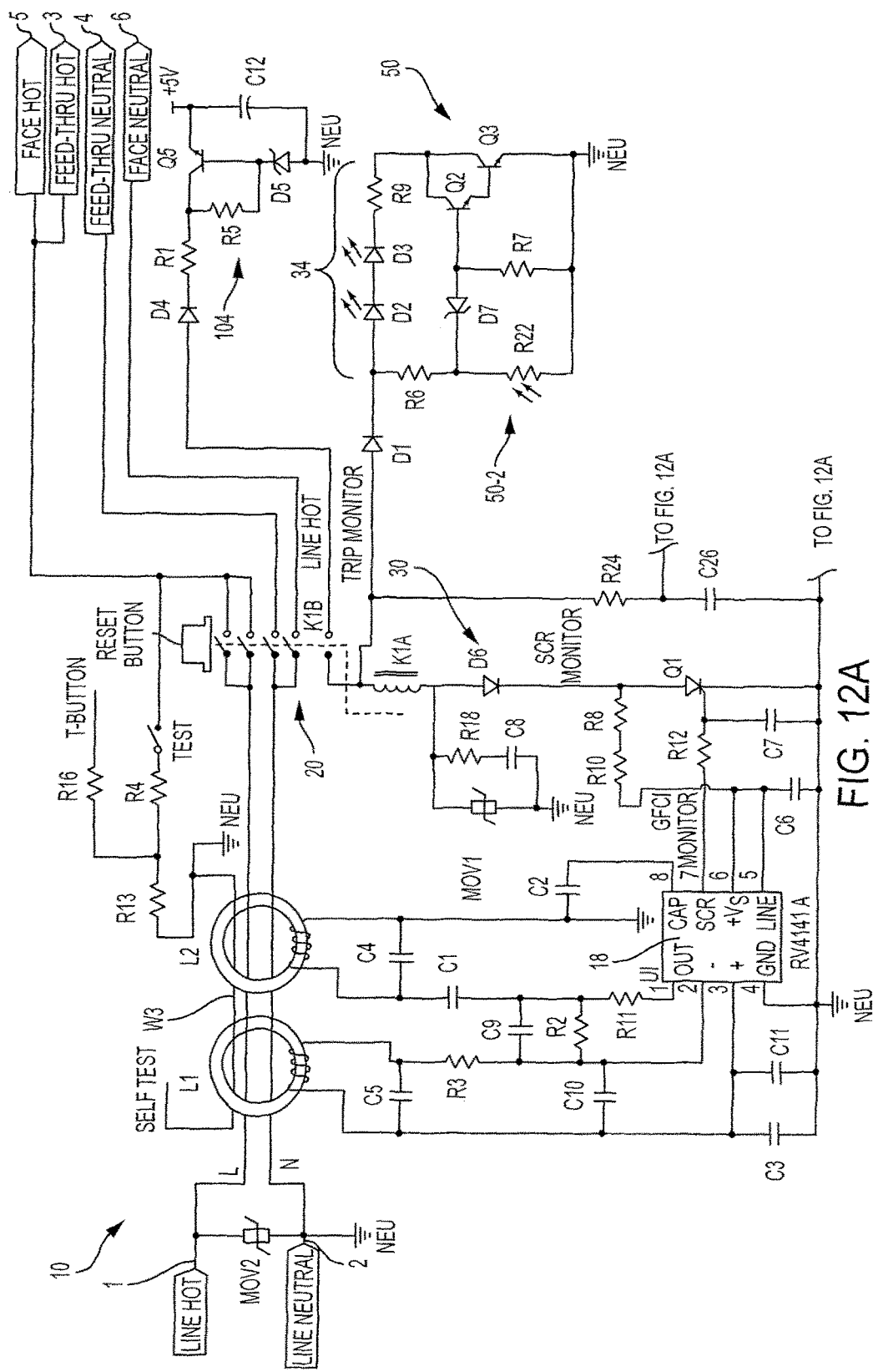
FIGS. 12A-B are schematic diagrams of a GFCI with an analog night light circuit in accordance with yet another embodiment of the present invention.
Figure 12B:
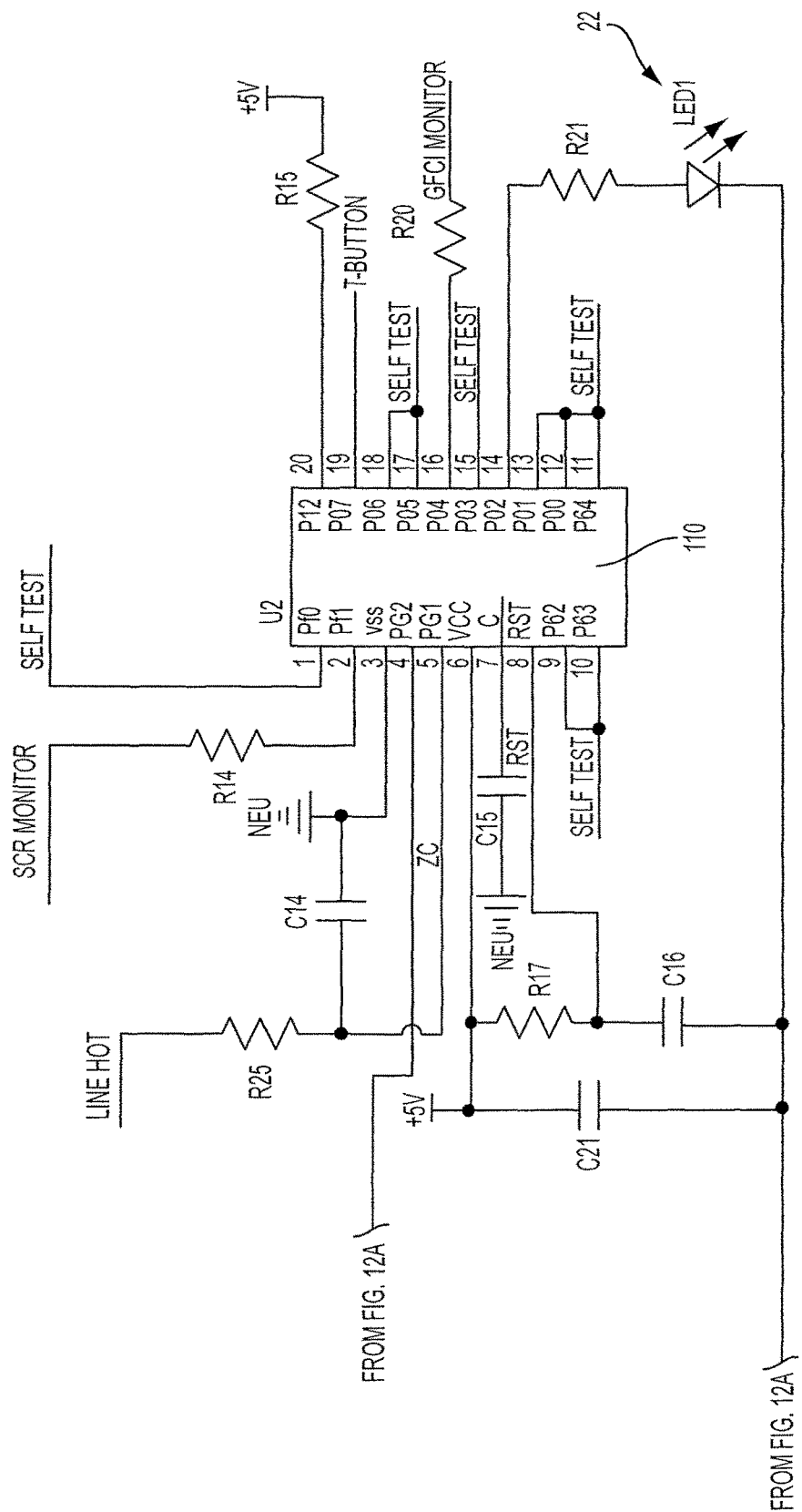

Referring to FIGS. 12A-12B, schematic diagrams of a protective device 10 in accordance with another embodiment of the present invention is disclosed. This embodiment is very similar to the embodiment depicted in FIGS. 11A-11B. In fact, the GFCI circuitry, miswiring and automatic self-testing features may be substantially identical. However, one difference between the two embodiments relates to the location of the nightlight circuit. In FIGS. 12A-12B, the nightlight circuit 50 is coupled between line hot and line neutral. Specifically, the night light power supply D1 is connected between the solenoid K1A and the auxiliary switch K1B. Nightlight circuit behavior and performance is otherwise the same as FIGS. 11A-11B and 14. Reference is made to U.S. patent application Ser. No. 13/834,636, which is incorporated herein by reference as though fully set forth in its entirety, for a more detailed explanation of a GFCI having a non-volatile Memory miswiring circuit. Those skilled in the art will appreciate that the night light circuit 50 depicted in FIGS. 12A-12B may be employed in an Arc Fault Circuit interrupter (AFCI) or a combination GFCI/AFCI. Reference is made to U.S. Pat. No. 6,421,214, which is incorporated herein by reference as though fully set forth in its entirety, for a more detailed explanation of an AFCI.

Figure 13A:
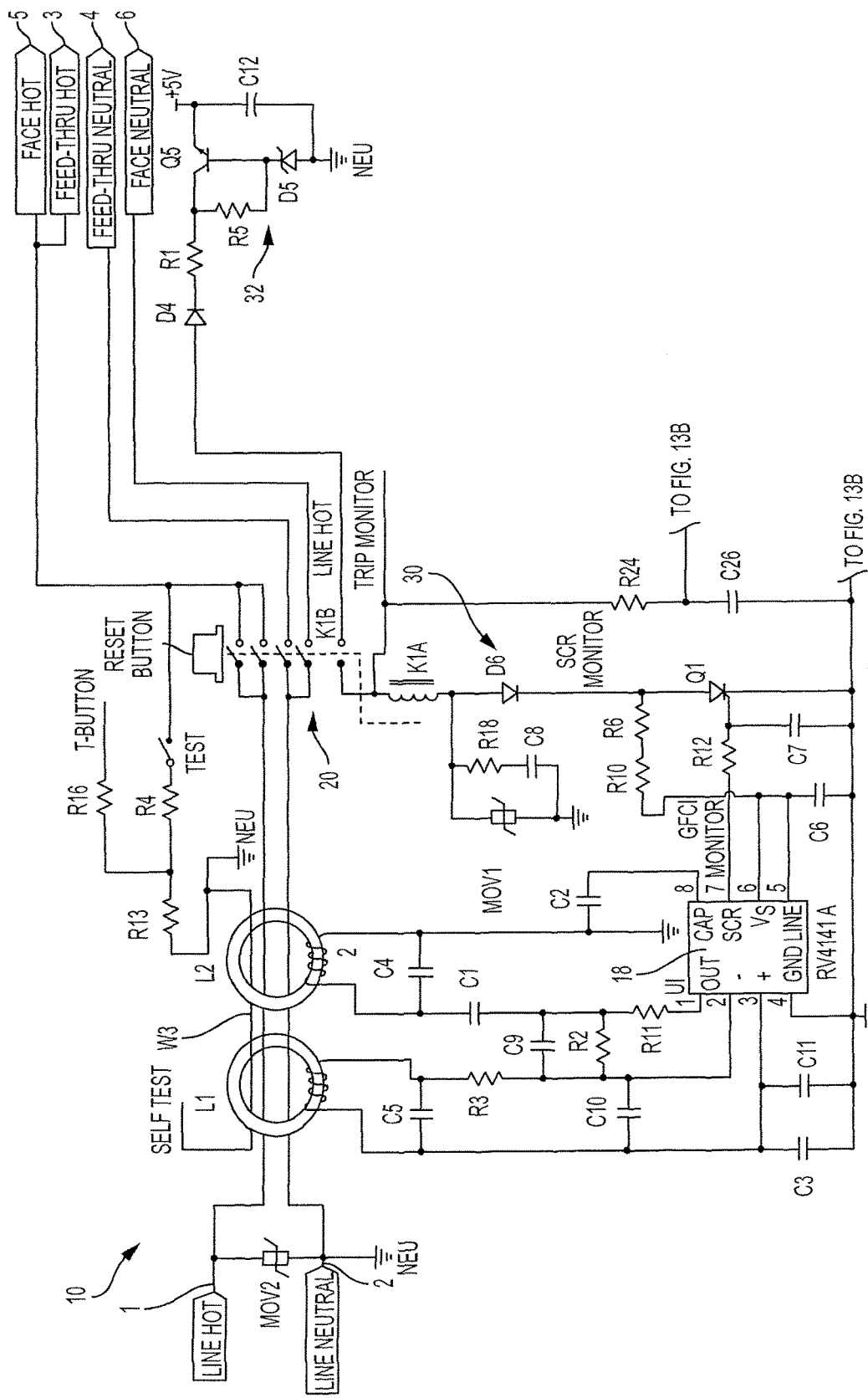
FIGS. 13A-B are schematic diagrams of a GFCI with an analog night light circuit in accordance with yet another embodiment of the present invention.
Figure 13B:
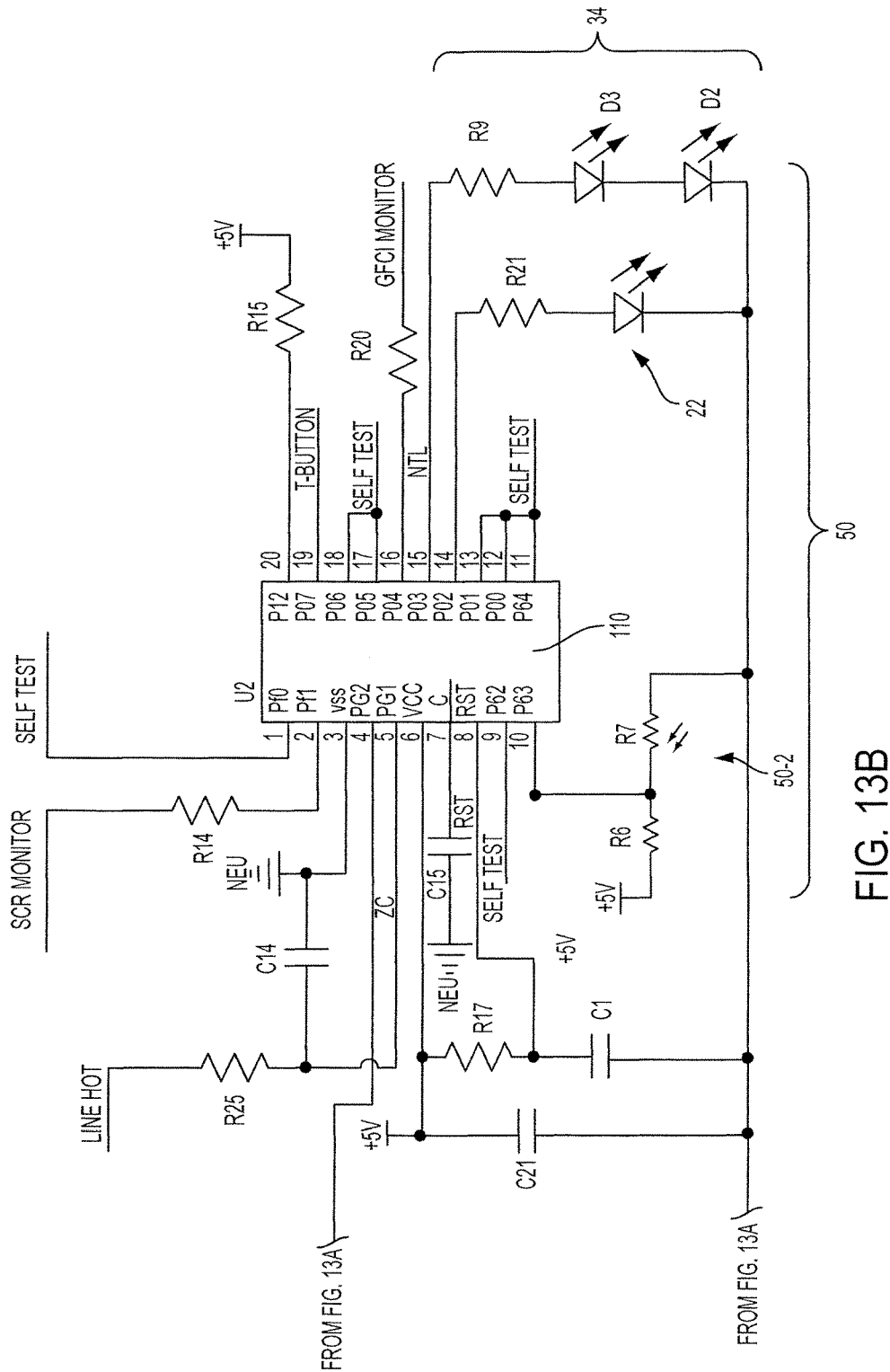

Referring to FIGS. 13A-13B, schematic diagrams of a protective device 10 in accordance with another embodiment of the present invention is disclosed. This embodiment is very similar to the embodiment depicted in FIGS. 11A-11B. In fact, the GFCI circuitry, miswiring and automatic self-testing features may be substantially identical. However, one difference between the two embodiments relates to the location of the nightlight circuit and the means for driving the nightlight circuit. In FIGS. 13A-13B, the nightlight circuit is coupled to and driven by the processor 110. The controller 110 is configured to read the sensor 50-2 (photoresistor R7) and control the nightlight light 34 (LEDs D2, D3). The TRIP monitor signal input provides processor 110 with knowledge of the device 10 trip state. Nightlight circuit behavior and performance is otherwise the same as FIGS. 11A-11B, 12A-12B, and 14. In an alternate embodiment, LED's D2 and D3 are pulsed with a PWM output from the MCU. Reference is made to U.S. patent application Ser. No. 13/834,636, which is incorporated herein by reference as though fully set forth in its entirety, for a more detailed explanation of a GFCI having a non-volatile Memory miswiring circuit. Those skilled in the art will appreciate that the night light circuit 50 depicted in FIGS. 12A-12B may be employed in an Arc Fault Circuit interrupter (AFCI) or a combination GFCI/AFCI. Reference is made to U.S. Pat. No. 6,421,214, which is incorporated herein by reference as though fully set forth in its entirety, for a more detailed explanation of an AFCI.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device for use in an ambient environment, the device comprising:
   a plurality of line terminals and a plurality of load terminals configured to be coupled to an AC electrical distribution system;
   an electro-optical assembly coupled to the plurality of line terminals or the plurality of load terminals, the electro-optical assembly including at least one circuit coupled to an ambient light sensor, a light emitting assembly and a visual indicator element, the visual indicator element being configured to provide a visual indicator signal, the ambient light sensor being configured to provide a sensor signal corresponding to ambient light in the ambient environment, the at least one circuit being configured to read the sensor signal during a time period when the visual indicator signal is not emitted, wherein at least one of the visual indicator element and the light emitting assembly is configured to provide a selectable color temperature signal based on a user input; and a bidirectional light pipe including a first light pipe branch coupled to the visual indicator element and a second light pipe branch coupled to the ambient light sensor, the bidirectional light pipe further including an interface region coupled between the first light pipe branch and the second light pipe branch, the interface region being further coupled to a bidirectional lens element configured to direct the ambient light into the second light pipe branch and direct the visual indicator signal into the ambient environment via the first light pipe branch.

2. The electrical wiring device of claim 1, wherein the at least one circuit being configured to provide a light control signal to the light emitting assembly in response to at least the sensor signal, the light emitting assembly being configured to emit a first light in response to the light control signal.

3. The electrical wiring device of claim 2 wherein the light control signal is characterized by a light control signal adjustment range between at least a first ambient light threshold position and a second ambient light threshold position, the light emitting assembly being configured to emit the first light when the light control signal is substantially at or below the first ambient light threshold position on the light control signal adjustment range and not emit the first light when the light control signal is at or substantially above the second ambient light threshold position, and wherein the light emitting assembly is further configured to drive the first light from an OFF light setting to a maximum light setting when the light control signal is increased by a light control signal amount, the light control signal amount substantially comprising about 5-10% of the light control signal adjustment range.

4. The electrical wiring device of claim 2 wherein the light control signal is configured to provide a current signal having a stepwise slope.

5. The electrical wiring device of claim 1, wherein the first light pipe branch includes a first light flux interface portion at a first-first end thereof and a second light flux interface portion disposed at a first-second end thereof, and wherein the second light pipe branch includes a third light flux interface portion at a second-first end thereof and a fourth light flux interface portion disposed at a second-second end thereof.

6. The electrical wiring device of claim 5, wherein the interface region is further coupled to the bidirectional lens element disposed at one of the first-first end, the first-second end, the second-first end, or the second-second end.

7. The electrical wiring device of claim 1 wherein the bidirectional lens element has a substantially concave shape.

8. The electrical wiring device of claim 1, wherein the bidirectional lens element is configured to diffuse light.

9. The electrical wiring device of claim 1, wherein the bidirectional light pipe is formed using a material selected from a group of materials including acrylic resin, polycarbonate, epoxy materials, or glass.

10. The electrical wiring device of claim 1 wherein the at least one circuit is selected from a group of circuits that includes a night light circuit, a ground fault circuit interrupter (GFCI), an arc fault circuit interrupter (AFCI), an embedded processor control circuit, a light dimmer, a motor control, or a fan speed control, USB charging device, Plug load controller, IoT capable devices.

11. The electrical wiring device of claim 1 wherein the at least one circuit includes a lighting control circuit selected from a group of lighting control circuits including an analog lighting control circuit, a digital lighting control circuit, or a processor controlled lighting control circuit.

12. An electrical wiring device for use in an ambient environment, the device comprising:
a housing assembly including a front cover having a user accessible front surface and a back body;
a plurality of line terminals at least partially disposed in the back body and configured to be coupled to an AC electrical distribution system;
a lens element at least partially disposed in the user accessible front surface; and
a circuit assembly disposed in the housing assembly, the circuit assembly including at least one first light emitting element and an ambient light sensor, the at least one first light emitting element being configured to selectively emit light through the lens element, the ambient light sensor being configured to sense ambient light from the ambient environment via the lens element, the circuit assembly being configured to provide a lighting control signal based on the ambient light sensed by the ambient light sensor, the at least one first light emitting element being configured to selectively emit light based on the lighting control signal.

13. The device of claim 12, further comprising a circuit interrupter and a plurality of load terminals at least partially disposed in the housing, the circuit interrupter being configured to electrically connect the plurality of line terminals and the plurality of load terminals in a reset state and electrically decouple the plurality of line terminals from the plurality of load terminals in a tripped state.

14. The device of claim 13, wherein the plurality of load terminals includes a plurality of receptacle load terminals disposed in the user accessible front surface or a plurality of feed-through load terminals at least partially disposed in the housing and configured to be coupled to the AC electrical distribution system.

15. The device of claim 13, wherein the circuit assembly further includes at least one sensor and a detector, the at least one sensor being configured to provide at least one sensor signal based on electrical signals propagating in the electrical distribution system, the detector providing a trip signal to trip the circuit interrupter when the at least one sensor signal meets predetermined criteria.

16. The device of claim 12, wherein the lens element is configured as a portion of a light pipe, the light pipe being configured to direct light from the at least one first light emitting element to the lens element and to direct ambient light from the lens element to the ambient light sensor.

17. The device of claim 16, wherein the light pipe includes a first light pipe branch having a first light flux interface portion coupled to the at least one first light emitting element and a second light pipe branch having a second light flux interface portion coupled to the ambient light sensor.

18. The device of claim 17, wherein a first portion of the circuit assembly is disposed on a first printed circuit board (PCB), the first portion including the ambient light sensor, a second portion of the circuit assembly being disposed on a second printed circuit board (PCB), the second portion including the at least one first light emitting element, the first PCB being disposed at a first distance from the user accessible front surface and the second PCB being disposed at a second distance from the user accessible front surface, the first distance and the second distance being different.

19. The device of claim 17, wherein the first light pipe branch is characterized by a first length and the second light pipe branch is characterized by a second length, the first length being different than the second length.

20. The device of claim 12, wherein the circuit assembly further includes a lighting control circuit coupled to the ambient light sensor, the lighting control circuit being configured to regulate a current level propagating through the at least one first light emitting element by a light control signal, the light control signal being characterized by a light control signal adjustment range, wherein the circuit assembly includes a gating circuit being configured to drive the at least one first light emitting element from an OFF light setting to a maximum light setting when the light control signal is increased by a light control signal amount, the light control signal amount comprising less than about 20% of the light control signal adjustment range, the lighting control circuit being an analog circuit, a digital circuit, or a processor circuit.

21. The device of claim 20, wherein the gating circuit is configured to drive the at least one first light emitting element to emit light when the light control signal is substantially at or below a first ambient light threshold position on the light control signal adjustment range and not emit the first light when the light control signal is substantially at or above a second ambient light threshold position.

22. The device of claim 21, wherein each of the first ambient light threshold position and the second ambient light threshold position is substantially within a range of positions on the light control signal adjustment range, the range of positions being between 50% and 70% of the light control signal adjustment range.

\* \* \* \* \*